(12) United States Patent
Tabata et al.

(10) Patent No.: US 6,868,674 B2
(45) Date of Patent: Mar. 22, 2005

(54) CONTROL APPARATUS FOR VARIABLE-CYLINDER ENGINE, AND CONTROL APPARATUS FOR VEHICLE

(75) Inventors: Atsushi Tabata, Okazaki (JP); Shuji Nagano, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/343,126

(22) PCT Filed: Sep. 14, 2001

(86) PCT No.: PCT/JP01/07975

§ 371 (c)(1),
(2), (4) Date: Jan. 28, 2003

(87) PCT Pub. No.: WO02/23028

PCT Pub. Date: Mar. 21, 2002

(65) Prior Publication Data

US 2004/0102286 A1 May 27, 2004

(30) Foreign Application Priority Data

Sep. 14, 2000 (JP) ........................................ 2000-279519

(51) Int. Cl.[7] .............................................. F01B 21/04
(52) U.S. Cl. .......................................... 60/706; 60/712
(58) Field of Search .......................... 60/698, 706, 712, 60/713

(56) References Cited

U.S. PATENT DOCUMENTS

| | | | |
|---|---|---|---|
| 4,194,417 A | 3/1980 | Kato et al. ..................... 74/866 |
| 5,562,086 A * | 10/1996 | Asada et al. ........... 123/568.21 |
| 5,911,646 A | 6/1999 | Tsutsui et al. ................ 477/93 |
| 6,334,498 B1 * | 1/2002 | Morisawa et al. ......... 180/65.2 |
| 6,629,024 B2 * | 9/2003 | Tabata et al. ................. 701/22 |

FOREIGN PATENT DOCUMENTS

| | | |
|---|---|---|
| JP | 57-131840 A | 8/1982 |
| JP | 58-202340 | 11/1983 |
| JP | 59-013153 | 1/1984 |
| JP | 60-173328 | 9/1985 |
| JP | 6-319206 A | 11/1994 |
| JP | 8-237806 A | 9/1996 |
| JP | 8-338283 A | 12/1996 |
| JP | 09-009416 | 1/1997 |
| JP | 10-004607 A | 1/1998 |
| JP | 10-169479 A | 6/1998 |
| JP | 10-220262 A | 8/1998 |
| JP | 11-093724 | 4/1999 |
| JP | 11-182275 A | 7/1999 |
| JP | 11-311137 | 11/1999 |
| JP | 11-350995 | 12/1999 |
| JP | 11-350995 A | 12/1999 |
| JP | 2000-97068 A | 4/2000 |
| JP | 2000-134718 A | 5/2000 |

* cited by examiner

Primary Examiner—Hoang Nguyen
(74) Attorney, Agent, or Firm—Kenyon & Kenyon

(57) ABSTRACT

Providing a control apparatus for a variable-cylinder engine or a vehicle control apparatus, which permits a further improvement in the fuel economy of the vehicle. Decompression-state setting means 102 is arranged to place appropriate ones of non-operating cylinders of the variable-cylinder engine 10 in the decompression state, on the basis of regenerative braking state of vehicle detected by regenerative-braking-state detecting means 100, so that only a required minimum number of the non-operating cylinders of the variable-cylinder engine 10 is/are placed in the decompression state, depending upon the detected regenerative braking state of the vehicle, making it possible to not only improve fuel economy of the vehicle but also assure sufficient engine braking of the vehicle.

10 Claims, 31 Drawing Sheets

FIG. 2

|     | C0 | C1 | C2 | B0 | B1 | B2 | B3 | B4 | F0 | D1 | D2 |
|-----|----|----|----|----|----|----|----|----|----|----|----|
| P   | ○  |    |    |    |    |    |    |    |    |    |    |
| R   |    |    | ○  | ○  |    |    |    | ○  |    |    |    |
| N   | ○  |    |    |    |    |    |    |    |    |    |    |
| 1st | ○  | ○  |    |    |    |    |    |    | ○  |    | ○  |
| 2nd | ◎  | ○  |    |    |    |    |    | ◎  | ○  |    |    |
| 3rd | ○  | ○  |    |    | ◎  | ○  | ○  |    | ○  |    |    |
| 4th | ○  | ○  | ○  |    |    | △  |    |    | ○  | ○  |    |
| 5th |    | ○  | ○  | ○  |    | △  |    |    | ○  |    |    |

○ ENGAGED

◎ ENGAGED FOR ENGINE BRAKE APPLICATION

△ ENGAGED (NOT CONTRIBUTING TRANSMISSION OF POWER)

DRIVE-POWER-SOURCE DATA MAP(A)

DRIVE-POWER-SOURCE DATA MAP(B)

|  |  |  | C1 | C2 | B1 | GEAR RATIO |
|---|---|---|---|---|---|---|
| ENGINE | D | 2nd | ○ | ○ | × | 1 |
|  |  | 2nd (LOW) | △ | ○ | × | 1 |
|  | Rev | HIGH | ○ | × | ○ | $-1/\rho 2$ |
|  |  | LOW | △ | × | ○ | $-1/\rho 2$ |
|  | N |  | × | × | ○ |  |
| MG | D | 1st | × | × | ○ | $1/\rho 1$ |
|  |  | 2nd (ASSIST) | ○ | ○ | × | 1 |
|  |  | 2nd (REGENERATION) | × | ○ | × | 1 |
|  | Rev | LOW | × | × | ○ | $-1/\rho 1$ |

○ : ENGAGED   △ : SLIPPING   × : RELEASED

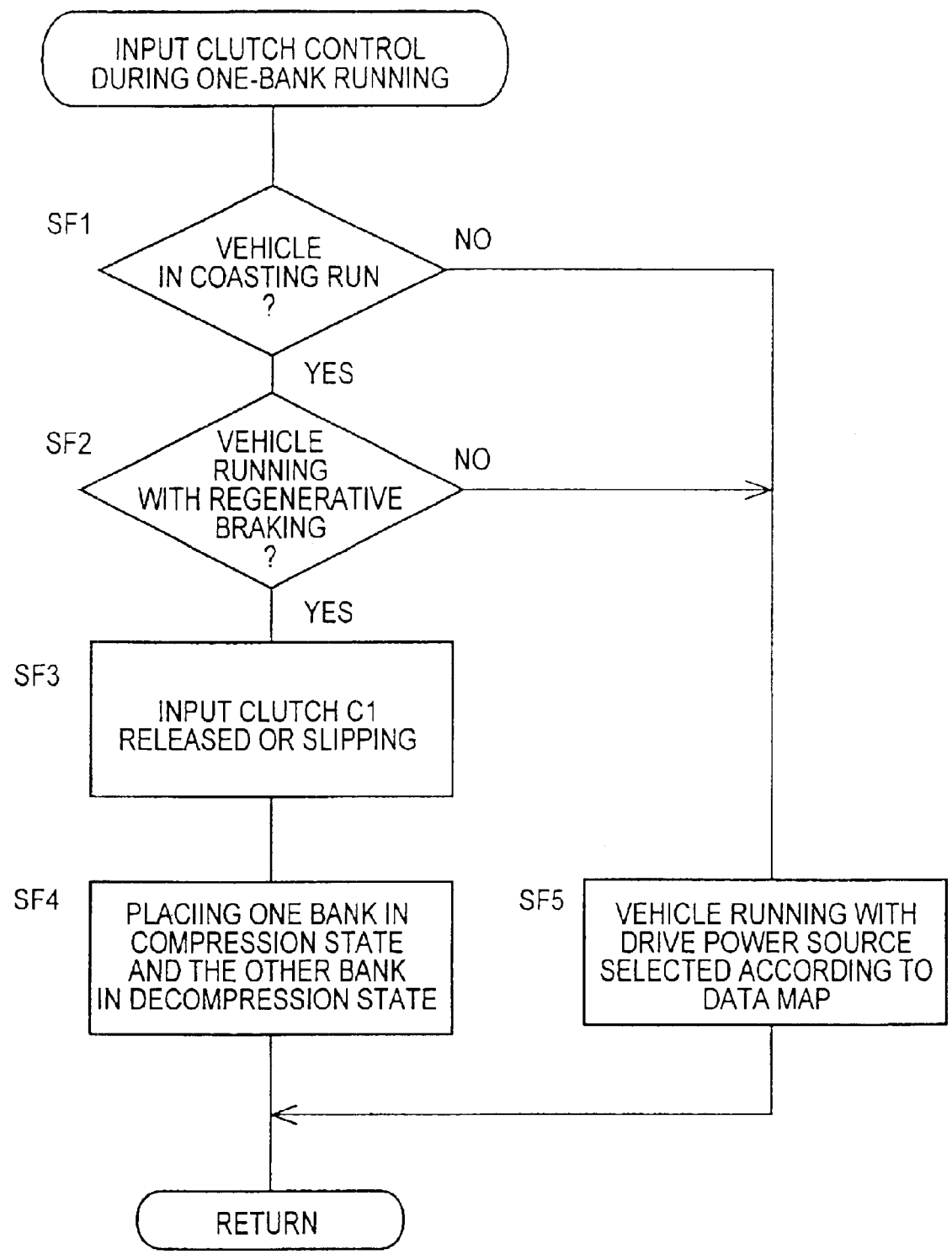

CONTROL APPARATUS FOR VARIABLE-CYLINDER ENGINE, AND CONTROL APPARATUS FOR VEHICLE

TECHNICAL FIELD

The present invention relates to a control apparatus for an automotive vehicle to be driven by a variable-cylinder engine and an electric motor or a motor/generator as drive power sources, and a control apparatus for the variable-cylinder engine, and more particularly to techniques for improving fuel economy of the vehicle.

BACKGROUND ART

There is known a hybrid drive system for an automotive vehicle, wherein a power transmitting mechanism connected to drive wheels is connected to an engine and an electric motor or a motor/generator. JP-A-11-350995 discloses an example of such a hybrid drive system, which uses a variable-cylinder engine which is selectively operable in one of a full-cylinder operating state and a partial-cylinder operating state (reduced-cylinder operating state). All of the cylinders of the engine are operated in the full-cylinder operating state, and some of the cylinders are operated in the partial-cylinder operating state. The present hybrid drive system is further arranged such that a kinetic energy of the vehicle during deceleration thereof is converted by regenerative braking operation of the electric motor into an electric energy, which is stored for use by the electric motor to provide an assisting drive torque upon starting of the vehicle, for instance, to thereby improve the fuel economy of the vehicle.

However, a need to improve the fuel economy of the vehicle is unlimited, and there has been a demand for a further improvement in the fuel economy of such a vehicle using a variable-cylinder engine and an electric motor as drive power sources, as described above.

The present invention was made in view of the background situation described above. It is therefore an object of this invention to provide a control apparatus for a variable-cylinder engine or an automotive vehicle control apparatus, which apparatus permits a further improvement in the fuel economy of the vehicle.

DISCLOSURE OF INVENTION

The above object may be achieved according to the principle of this invention, which provides a control apparatus for a variable-cylinder engine, characterized by comprising (a) regenerative-braking-state detecting means for detecting a regenerative braking state of a vehicle, and (b) decompression-state setting means for placing selected ones of non-operating cylinders of the variable-cylinder engine in a decompression state, on the basis of the regenerative braking effect of the vehicle detected by the regenerative-braking-effect detecting means.

In the present control apparatus, the decompression-state setting means is arranged to place appropriate ones of the non-operating cylinders of the variable-cylinder engine in the decompression state, on the basis of the regenerative braking state of the vehicle detected by the regenerative-braking-state detecting means in the decompression state, so that only a required minimum number of the non-operating cylinders of the variable-cylinder engine 10 is/are placed in the decompression state, depending upon the detected regenerative braking state of the vehicle, making it possible to not only improve the fuel economy of the vehicle but also assure sufficient engine braking of the vehicle.

Where the variable-cylinder engine has a pair of banks each of which has a plurality of cylinders and which are operable independently of each other, the decompression-state setting means is preferably arranged to place both of the two banks of the variable-cylinder engine in the compression state when the regenerative-braking-state detecting means has not detected a regenerative braking state of the vehicle, and place one of the two banks of the variable-cylinder engine in the compression state and the other bank in the decompression state when the regenerative-braking-state detecting means has detected a regenerative braking state of the vehicle. In the decompression state, the cylinder chamber is in a non-compressed state even in the compression stroke. While the vehicle is not placed in a regenerative braking state, the engine provides an appropriate engine-braking effect since the two banks are both placed in the compression state. While the vehicle is placed in a regenerative braking state, on the other hand, the engine-braking effect is reduced by an amount corresponding to the amount of regenerative braking effect, since one and the other of the two banks are placed in the compression state and the decompression state, respectively, so that the total braking effect applied to the vehicle is substantially equal to that while the vehicle is not placed in the regenerative braking state, and the fuel economy is improved owing to the regeneration of an electric energy in the regenerative braking state.

The present control apparatus is preferably provided with engine-stop-mode detecting means for determining whether the vehicle is running in an engine-stop running mode, for instance, in a motor-drive mode or a fuel-cut mode, with the variable-cylinder being held at rest. In this case, the regenerative-braking-state detecting means is operated to detect the regenerative braking state of the vehicle, when the engine-stop-mode detecting means has detected that the vehicle is running in the engine-stop running mode. This arrangement is effective to improve the fuel economy of the vehicle and assure a sufficient engine braking effect, while the vehicle is running in the regenerative braking state and in the engine-stop mode with the variable-cylinder engine being held at rest.

The present control apparatus is preferably provided with engine-restart-possibility determining means for determining whether there is a possibility that the variable-cylinder engine will be restarted. In this case, the regenerative-braking-state detecting means is operated to detect the regenerative braking state of the vehicle, when the engine-restart-possibility determining means determines that there is a possibility that the variable-cylinder engine will be restarted. The decompression-state setting means is arranged to place one of the banks of the variable-cylinder engine in the compression state and the other bank in the decompression state, when the regenerative-braking-state detecting means has detected a regenerative braking state of the vehicle. In the regenerative braking state of the vehicle, therefore, one of the banks is placed in the compression state so that the variable-cylinder engine can be restarted in a short time when the engine is commanded to be restarted.

The present control apparatus is preferably arranged such that when the engine-restart-possibility determining means indicated above determines that there is not a possibility that the variable-cylinder engine will be restarted, the decompression-state setting means places both banks of the variable-cylinder engine in the compression state if the regenerative-braking-state detecting means has not detected a regenerative braking state of the vehicle, and places both banks of the variable-cylinder engine in the decompression state if the regenerative-braking-state detecting means has detected a regenerative braking state of the vehicle. This arrangement is advantageous in that an adequate engine braking effect is obtained while the vehicle is not placed in a regenerative braking state in which both banks are placed in the compression state, and that the amount of electric energy generated by the regenerative braking is maximized while the vehicle is placed in the regenerative braking state in which both banks are placed in the decompression state.

The object indicated above may also be achieved according to a second invention, which provides a control apparatus for a variable-cylinder engine to which an electric generator is operatively connected, characterized by comprising (a) electricity-generating-mode determining means for determining whether it is required to establish an electricity generating mode in which the electric generator is operated to generate an electric energy, and (b) cylinder-number switching means, operable when the electricity-generating-mode determining means determines that it is required to establish the electricity generating mode, for placing the variable-cylinder engine in a partial-cylinder operating state.

In the present control apparatus, the cylinder-number switching means places the variable-cylinder engine in the partial-cylinder operating state, when the electricity-generating-mode determining means determines that the electric generator is required to be operated to generate an electric energy. Thus, the engine is operated in the partial-cylinder operating state when it is necessary to generate an electric energy. Accordingly, the fuel economy during the operation of the electric generator is improved, since the electric generator is operated by the variable-cylinder engine operated with a reduced loss of rotary motion.

Where the variable-cylinder engine has a pair of banks each of which has a plurality of cylinders and which are operable independently of each other, the cylinder-number switching means is preferably arranged to place one of the banks of the variable-cylinder engine in the operating state and place the other bank in the decompression state, when the electricity-generation-mode determining means determines that the electric generator is required to be operated to generate an electric energy. Accordingly, the loss of rotary motion of the variable-cylinder engine is further reduced to accordingly improve the fuel economy during the generation of an electric energy.

The cylinder-number switching means is preferably arranged to change the number of the operating cylinders of the variable-cylinder engine which are used to operate the electric generator, depending upon whether the presently selected operating position of a shift lever of the vehicle is one of drive positions as the positions, or one of non-drive positions. Namely, the variable-cylinder engine is placed in the full-cylinder operating state when the output torque oscillation of the variable-cylinder engine is transmitted to the vehicle wheels through the power-transmitting path, with the shift lever placed in any drive position. The variable-cylinder engine is placed in the partial-cylinder or single-bank operating state when the output torque oscillation of the variable-cylinder engine is not transmitted to the vehicle wheels, that is, when the power-transmitting path is cut off with the shift lever placed in any non-drive positions. This arrangement is effective to reduce the vehicle vibration while the electric generator is operated by the variable-cylinder engine.

The cylinder-number switching means is preferably arranged such that the number of the operating cylinders of the variable-cylinder engine during running of the vehicle is in principle changed depending upon the number of the operating cylinders determined according to a stored drive-power-source data map, so that the electric generator is operated by the variable-cylinder engine the number of the operating cylinders of which is determined according to the drive-power-source data map. Accordingly, the fuel economy while the vehicle is running is also improved.

According to a third invention which is principally identical in concept with the inventions described above, there is provided a control apparatus for a vehicle to be driven by both or one of a variable-cylinder engine and an electric generator, as a drive power source, characterized by comprising (a) vehicle-deceleration detecting means for determining whether the vehicle is in a decelerating state, and (b) drive-power-source braking control means operable when the vehicle-deceleration detecting means determines that the vehicle is in a deceleration state, for controlling a braking torque produced by the drive power source, on the basis of a regenerative braking torque produced by the electric generator, and an amount of decompression of non-operating cylinders of the variable-cylinder engine.

In the present arrangement, the braking torque produced by the drive power source during deceleration of the vehicle is controlled by the drive-power-source braking control means, on the basis of the regenerative braking torque produced by the electric generator and the amount of decompression of the non-operating cylinders of the variable-cylinder engine. Thus, the drive-power-source braking torque is adjusted according to the decompression amount of the variable-cylinder engine, as well as the regenerative braking torque. Namely, the number of parameters used to control the deceleration value of the vehicle is increased, so that the deceleration value can be controlled with an increased degree of adequacy.

Preferably, the present control apparatus includes vehicle-deceleration detecting means for determining whether the vehicle is in a decelerating state, and desired-deceleration calculating means operable when the vehicle-deceleration detecting means determines that the vehicle is in the decelerating state, to calculate the desired deceleration value of the vehicle under deceleration, on the basis of the actual running speed of the vehicle and the preset deceleration value preset by the operator of the vehicle, and according to a stored predetermined relationship among the desired deceleration value, the actual running speed and preset deceleration value. The above-indicated drive-power-source braking control means is arranged to control the drive-power-source braking torque, on the basis of the regenerative braking torque produced by the electric generator (motor/generator) and the decompression state of the non-operating cylinders of the variable-cylinder engine, such that the actual deceleration value of the vehicle coincides with the calculated desired deceleration value. Accordingly, the vehicle can be decelerated at a value as desired by the vehicle operator.

The drive-power-source control means preferably includes: regenerative-braking-torque control means for controlling an amount of regenerative braking torque produced by the motor/generator, decompression-state setting means for placing selected ones of the cylinders of the variable-cylinder engine in a decompression state, and decompression-amount control means for controlling a resistance of those selected cylinders to an rotary motion of the engine, by controlling a resistance to a flow of intake air into those selected cylinders, by controlling an angle of opening of the throttle valve, for example. In this arrangement, the resistance to the rotary motion of the variable-cylinder engine is increased when the amount of the regenerative braking torque produced by the electric generator (motor/generator) is reduced, so that the resistance is increased to compensate for a shortage of the regenerative braking torque.

Preferably, the present control apparatus further comprises regenerative-braking-adjustment detecting means for determining whether it is necessary to adjust the regenerative braking operation of the electric generator (motor/generator), and lock-up clutch releasing means for placing a fluid-coupling device disposed between the variable-cylinder engine and the automatic transmission, in its released state or partially slipping state, when the regenerative-braking operation-adjustment detecting means determines that it is necessary to adjust the regenerative braking operation of the motor/generator. According to this arrangement, a shock that may be caused by the adjustment of the regenerative braking operation of the electric generator (motor/generator) can be absorbed by the fluid-coupling device.

The object indicated above may be achieved according to a fourth invention, which provides a control apparatus for a variable-cylinder engine to which a transmission is connected, characterized by comprising (a) engine-idling vehicle-stop detecting means for determining whether a vehicle is held stationary with the variable-cylinder engine being held in an idling state, and (b) partial-cylinder/neutral-transmission control means operable when the engine-idling vehicle-stop detecting means determines that the vehicle is held stationary with the variable-cylinder engine being in the idling state, for placing the variable-cylinder engine in a partial-cylinder operating state and at the same time placing the transmission in a neutral state.

In the present control apparatus, the partial-cylinder/neutral-transmission control means places the variable-cylinder engine in the partial-cylinder operating state and at the same time places the transmission in the neutral state, when the engine-idling vehicle-stop detecting means determines that the vehicle is held stationary with the variable-cylinder engine being held in an idling state. Accordingly, the fuel economy of the vehicle is improved, and the vibration and noses are reduced, while the vehicle is held stationary with the engine in the idling state.

Preferably, the present control apparatus further comprises engine-stop detecting means for determining whether the vehicle is held stationary, and hill-holding means operable when the engine-stop detecting means does not determine that the vehicle is held stationary, for activating the braking device to hold the vehicle stationary. Accordingly, the vehicle can be held stationary even on a slope, while the transmission is placed in its neutral state with the variable-cylinder engine placed in the partial-cylinder operating state.

Preferably, the present control apparatus further comprises partial-cylinder/neutral-transmission condition determining means for determining whether it is concurrently possible to place the variable-cylinder engine in a partial-cylinder operating state, place the transmission in a neutral state and operate the hill-holding means to hold the vehicle stationary. If the partial-cylinder/neutral-transmission condition determining means determines that it is not concurrently possible to place the variable-cylinder engine in the partial-cylinder operating state, place the transmission in the neutral state and operate the hill-holding means to hold the vehicle stationary, the variable-cylinder engine is placed in the full-cylinder operating state or the two-bank operating state. Accordingly, the idling of the variable-cylinder engine is defected in the full-cylinder operating state, while the variable-cylinder engine is in a warm-up operation (while the engine is still cold), while the engine is not operable in the partial-cylinder operating state due to some defect, wile the transmission is still cold, or is not normally placed in its neutral state due to some defect.

The object indicated above may be achieved according to a fifth invention, which provides a control apparatus for a vehicle to be driven by a variable-cylinder engine and an electric motor as a drive power source, characterized by comprising (a) motor-drive-mode detecting means for determining whether the vehicle is running in a motor-drive mode with an operation of the electric motor, and (b) partial-cylinder operation commanding means operable when the motor-drive-mode detecting means determines that the vehicle is running in the motor-drive mode, for placing the variable-cylinder operating state.

In the present vehicle control apparatus, the variable-cylinder engine is operated in the partial-cylinder or single-bank operating state, during running of the vehicle in the motor-drive mode, so that the fuel economy of the vehicle is improved.

The present vehicle control apparatus is preferably arranged such that the drive force of the variable-cylinder engine is transmitted to the drive wheels through the continuously variable transmission, so that the fuel economy of the vehicle is further improved.

The present vehicle control apparatus preferably further comprises power-transmission restricting means for restricting transmission of a drive force between the variable-cylinder engine and a drive shaft disposed downstream of the variable-cylinder engine, during operation of the variable-cylinder engine in the partial-cylinder or single-bank operating state by the partial-cylinder operation commanding means. For instance, the power-transmission restricting means is arranged to release an input clutch disposed between the variable-cylinder engine and the vehicle drive wheels. According to this arrangement, vibration of the variable-cylinder engine which is relatively large in the partial-cylinder operating state is not transmitted downstream of the engine.

The object indicated above may be achieved according to a sixth invention, which provides a control apparatus for a vehicle to be driven by a variable-cylinder engine and an electric motor as a drive power source, characterized by comprising (a) regenerative-braking-control detecting means for determining whether the vehicle is running with a regenerative braking operation of the electric motor so as to convert a kinetic energy of the vehicle into an electric energy, and (b) partial-cylinder-operation commanding and power-transmission restricting means, operable when the regenerative-braking-control detecting means determines that the vehicle is running with the regenerative braking operation of the electric motor, for placing the variable-cylinder engine in a partial-cylinder operating state and at the same time restricting transmission of a drive force between the variable-cylinder engine and a drive shaft disposed downstream of the variable-cylinder engine.

In the present vehicle control apparatus, the fuel economy of the vehicle is improved, and the engine torque oscillation and noise are reduced, during running of the vehicle with a regenerative braking operation of the electric generator (motor/generator) so as to convert a kinetic energy of the vehicle into an electric energy, since the variable-cylinder engine is placed in the partial-cylinder operating state and since the transmission of the drive force between the engine and the downstream drive shaft is restricted.

The present control apparatus preferably further comprises coasting-run detecting means for determining whether the vehicle is in a decelerating state. In this case, the partial-cylinder-operation commanding and power-transmission restricting means is operated upon determination by the coasting-run detecting means that the vehicle is in a decelerating state, for placing the variable-cylinder engine in the partial-cylinder operating state and at the same time restricting transmission of the drive force between the variable-cylinder engine and the downstream drive shaft. According to this arrangement, the fuel economy of the vehicle is improved, and the engine torque oscillation and noise are reduced, during deceleration of the vehicle with the regenerative braking operation, since the variable-cylinder engine is placed in the partial-cylinder operating state and since the transmission of the drive force between the engine and the downstream drive shaft is restricted.

The present embodiment is preferably arranged such that the drive-power-source switching means is operated when the vehicle is not in a decelerating state or is not running with the regenerative braking operation. In this case, the switching means determines the number of the operating cylinders of the variable-cylinder engine on the basis of an actual running speed of the vehicle and an actual output torque and according to a stored predetermined relationship, and operates the variable-cylinder engine with the determined number of the cylinders placed in the operating state. This arrangement improves the fuel economy of the vehicle.

The partial-cylinder-operating commanding and power-transmission restricting means is preferably arranged to determine the amount of slipping of an input clutch, on the basis of an oscillation amount included in an output torque of said variable-cylinder engine, and according to a stored predetermined relationship between these parameters, and control the input clutch disposed between the variable-cylinder engine and the continuously variable transmission such that the actual amount of slipping of the input clutch is equal to the determined amount of slipping. The arrangement advantageously restricts the torque oscillation as needed.

BRIEF DESCRIPTION OF DRAWINGS

FIG. 2 is a table indicating a relationship between combinations of operating states of frictional coupling devices in an automatic transmission of the vehicle drive system of FIG. 1, and gear positions of the automatic transmission which are established by the respective combinations.

FIG. 37 is a flow chart illustrating a part of a control operation of the electronic control device of FIG. 34.

BEST MODE FOR CARRYING OUT THE INVENTION

Figure 1:
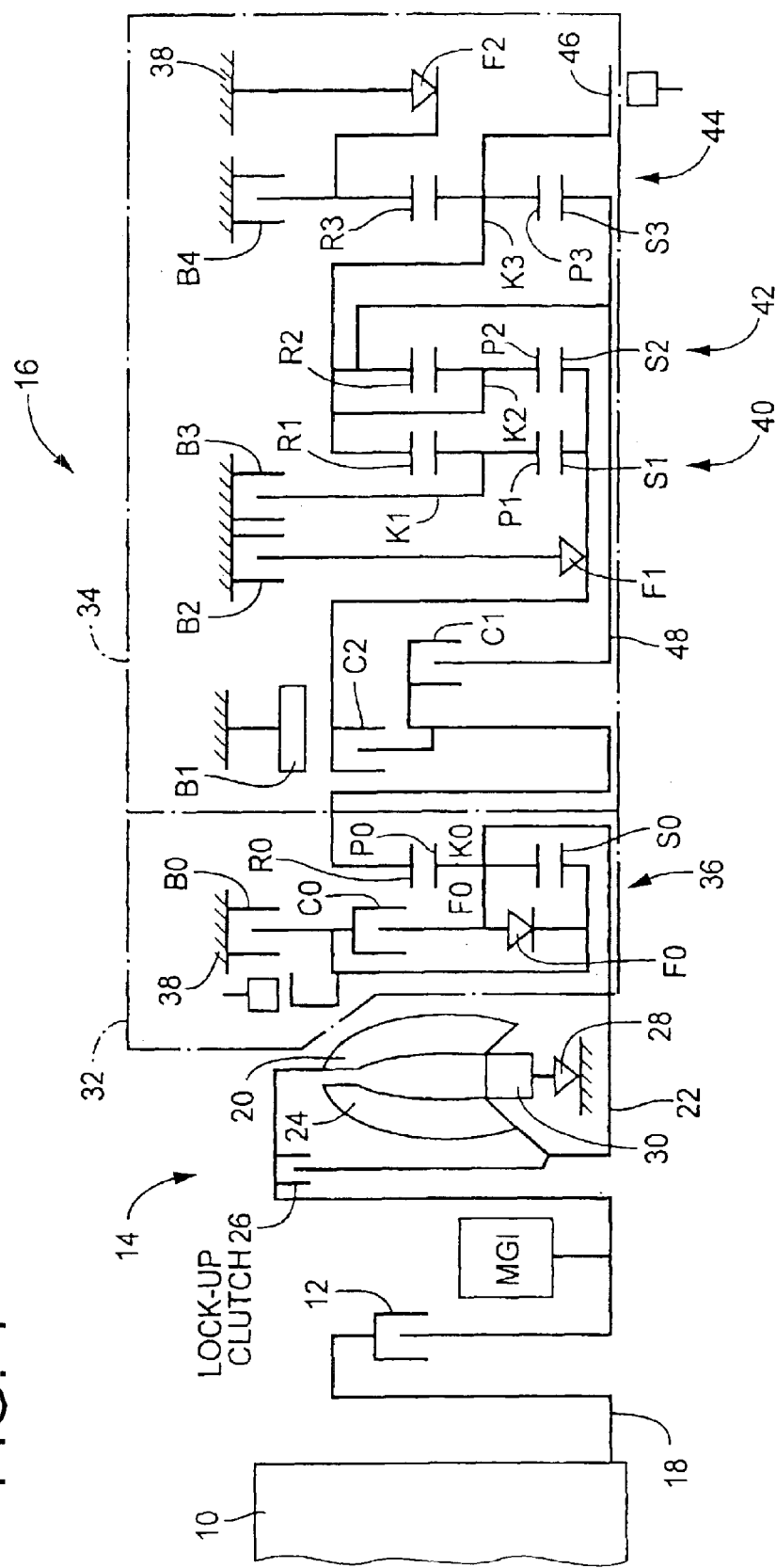
FIG. 1 is a schematic view showing a part of a drive system of an automotive vehicle to which a vehicle control apparatus according to one embodiment of this invention is applicable.

Referring to the drawings, the preferred embodiments of this invention will be described in detail.

FIG. 1 is a schematic view for explaining an arrangement of a power transmitting system of an automotive vehicle to which a control apparatus according to one embodiment of this invention is applicable. Referring to the figure, an output of a variable-cylinder engine 10 provided as a drive power source or a driving motor is transferred to an automatic transmission 16 through a clutch 12 and a torque converter 14, and is transmitted from the automatic transmission 16 to drive wheels through a differential gear device and drive axles, which are not shown. Between the clutch 12 and the torque converter 14, there is disposed a first motor/generator MG1 (hereinafter referred to as "MG1") which functions as an electric motor or an electric generator. The MG1 also functions as drive power source or a driving motor. The torque converter 14 includes a pump impeller 20 connected to the clutch 12, a turbine impeller 24 connected to an input shaft 22 of the automatic transmission 16, a lock-up clutch 26 for directly connecting the pump and turbine impellers 20, 24, and a stator impeller 30 which is prevented by a one-way clutch 28 from rotating in one of opposite directions. To the variable-cylinder engine 10, there is operatively connected a motor/generator MG2 (hereinafter referred to as "MG2") which functions as an electric motor for starting the engine 10, and as an electric generator.

The variable-cylinder engine 10 indicated above includes variable-valve-timing mechanisms arranged to change an operating timing of intake and exhaust valves of each cylinder and a fuel injector valve arranged to supply a fuel or stop the fuel supply to each cylinder. The variable-cylinder engine 10 is arranged to place selected ones of its cylinders in a non-operating state, by opening the intake or exhaust valve in the compression stroke of each selected cylinder (by placing each selected cylinder in a decompression state) while stopping the fuel supply to each selected cylinder, so that the effective displacement of the variable-cylinder engine 10 can be changed depending upon the load acting on the engine 10, thereby reducing the amount of consumption of the fuel.

The automatic transmission 16 includes a first transmission unit 32 having two operating positions, that is, a high-speed position and a low-speed position, and a second transmission unit 34 having five operating positions, that is, one reverse drive position and four forward drive positions. The first transmission unit 32 includes a high-low planetary gear device 36 having a sun gear S0, a ring gear R0, and planetary gears P0 which are rotatably supported by a carrier K0 and which mesh with the sun gear S0 and ring gear R0. The first transmission unit 32 further includes a clutch C0 disposed between the sun gear S0 and the carrier K0, and a brake B0 disposed between the sun gear S0 and a housing 38.

The second transmission unit 34 includes a first planetary gear set 40, a second planetary gear set 42, and a third planetary gear set 44. The first planetary gear set 40 includes a sun gear S1, a ring gear R1, and planetary gears P1 which are rotatably supported by a carrier K1 and which mesh with the sun gear S1 and ring gear R1. The second planetary gear set 42 includes a sun gear S2, a ring gear R2, and planetary gears P2 which are rotatably supported by a carrier K2 and which mesh with the sun gear S2 and ring gear R2. The third planetary gear set 44 includes a sung gear S3, a ring gear R3, and planetary gears P3 which are rotatably supported by a carrier K3 and which mesh with the sun gear S3 and ring gear R3.

The sun gears S1 and S2 are integrally connected to each other, while the ring gear R1 and carriers K1 and K2 are integrally connected to each other. The carrier K3 is connected to an output shaft 46 of the automatic transmission 16. A clutch C1 is disposed between the ring gear R0 and an intermediate shaft 48 connected to the sun gear S3, while a clutch C2 is disposed between the sun gears S1 and S2 and the intermediate shaft 48. A brake B1 for inhibiting rotation of the sun gears S1 and S2 is fixed to the housing 38. A one-way clutch F1 and a brake B2 are disposed in series with each other between the sun gears S1 and S2 and the housing 38. This one-way clutch F1 is engaged when the sun gears S1 and S2 receive a torque so as to be rotated in a direction opposite to the direction of rotation of the input shaft 22.

A brake B3 is disposed between the carrier K1 and the housing 38, while a brake B4 and a one-way clutch F2 are disposed in parallel with each other between the ring gear R3 and the housing 38. This one-way clutch F2 is engaged when the ring gear R3 receives a torque so as to be rotated in the direction opposite to the direction of rotation of the input shaft 22.

The automatic transmission 16 constructed as described above has one reverse drive position and five forward drive positions, which are selectively established as indicated in the table of FIG. 2 by way of example. In FIG. 2, "○" indicates the engaged state of each coupling device, and the absence of any symbol indicates the released state of each coupling device. "⊚" indicates the engagement of the appropriate coupling device for applying an engine brake to the vehicle, and "Δ" indicates the engagement of the appropriate coupling device, which does not contribute to transmission of power. It will be understood from the table of FIG. 2 that a shift-up action of the automatic transmission 16 from a 2nd-speed position to a 3rd-speed position is a so-called "clutch-to-clutch" shifting action wherein the brake B2 is engaged while at the same time the brake B3 is released, so that there exists a period during which a drive torque is transmitted through both the brake B3 placed in the process of its releasing action and the brakes B2 placed in its engaging action. The other shifting actions of the automatic transmission 16 are performed by engaging or releasing the appropriate one of the clutches and brakes. The clutches and brakes indicated above are hydraulically operated frictional coupling devices each of which is actuated by a hydraulic actuator.

Figure 3:
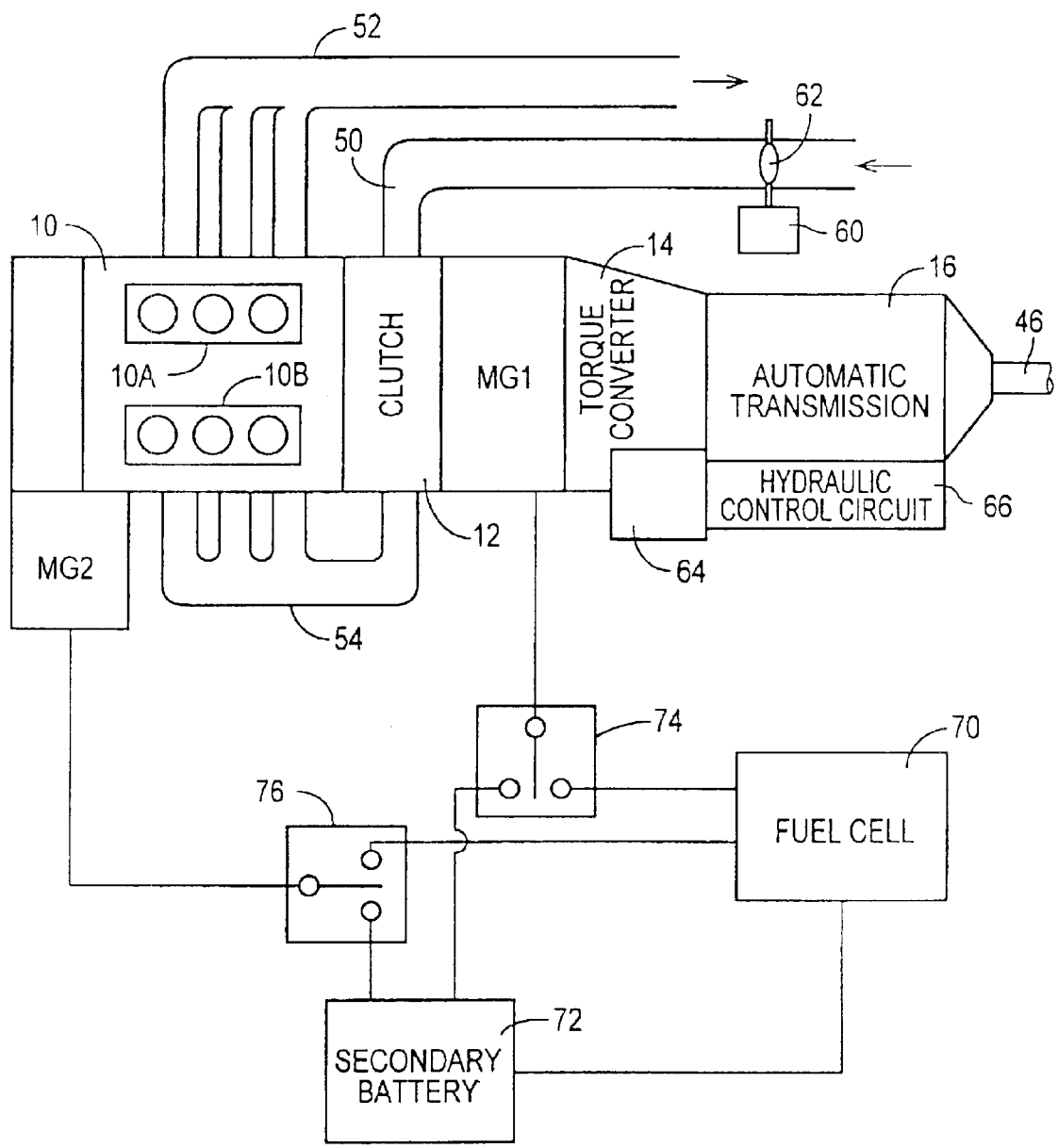
FIG. 3 is a view showing devices associated with an engine of the vehicle provided with the drive system of FIG. 1.

The variable-cylinder engine 10 is arranged to permit a change of the number of the operating cylinders and the number of its non-operating cylinders, as needed. For instance, the variable-cylinder engine 10 is provided with a pair of banks 10A and 10B disposed on the respective left and right sides, each bank 10A, 10B each consisting of three cylinders, as shown in FIG. 3. The cylinders of each bank 10A, 10B are operated simultaneously, and independently of the other bank.

As shown in FIG. 3, the variable-cylinder engine 10 has intake pipe 50 in which there is disposed a throttle valve 62 operated by a throttle actuator 60. The throttle valve 62 is controlled such that an angle of opening $\theta_{TH}$ of the throttle valve 62 is in principle controlled to a value corresponding to an operating amount $\theta_{ACC}$ of an accelerator pedal (not shown). However, the angle of opening $\theta_{TH}$ is controlled to adjust the output of the variable-cylinder engine 10, depending upon various running conditions of the vehicle, for instance, depending upon whether the automatic transmission 16 is in a shifting action or not. Although FIG. 3 shows only one intake pipe 50 provided with the throttle valve 62 operated by the throttle actuator 60, and only one exhaust pipe 52, two pairs of intake and exhaust pipes 50, 52 are preferably provided for the respective banks 10A and 10B, independently of each other.

The above-indicated MG1 is disposed between the variable-cylinder engine 10 and the automatic transmission 16, such that the clutch 12 is disposed between the variable-cylinder engine 10 and the MG1. The hydraulically operated frictional coupling devices of the automatic transmission 16 and the lock-up clutch 26 are controlled by a hydraulic control circuit 66 which receives a pressurized fluid from an electrically operated hydraulic pump 64. To the variable-cylinder engine 10, there is operatively connected a second motor/generator MG2 (hereinafter referred to as "MG2"), which functions as a starter motor and an electric generator. There are also provided a fuel cell 70 and a secondary battery 72 which serve as an electric power source for the MG1 and MG2, and switching devices 74, 76 which are arranged to control amounts of electric current to be applied from the fuel cell 70 and the secondary battery 72 to the MG1 and MG2, and further arranged to amounts of electric current with which the secondary battery 72 is charged by the MG1 and MG2. Each of the switching devices 74, 76 is a device capable of performing a switching function, for instance, a semiconductor element capable of serving as an inverter.

Figure 4:
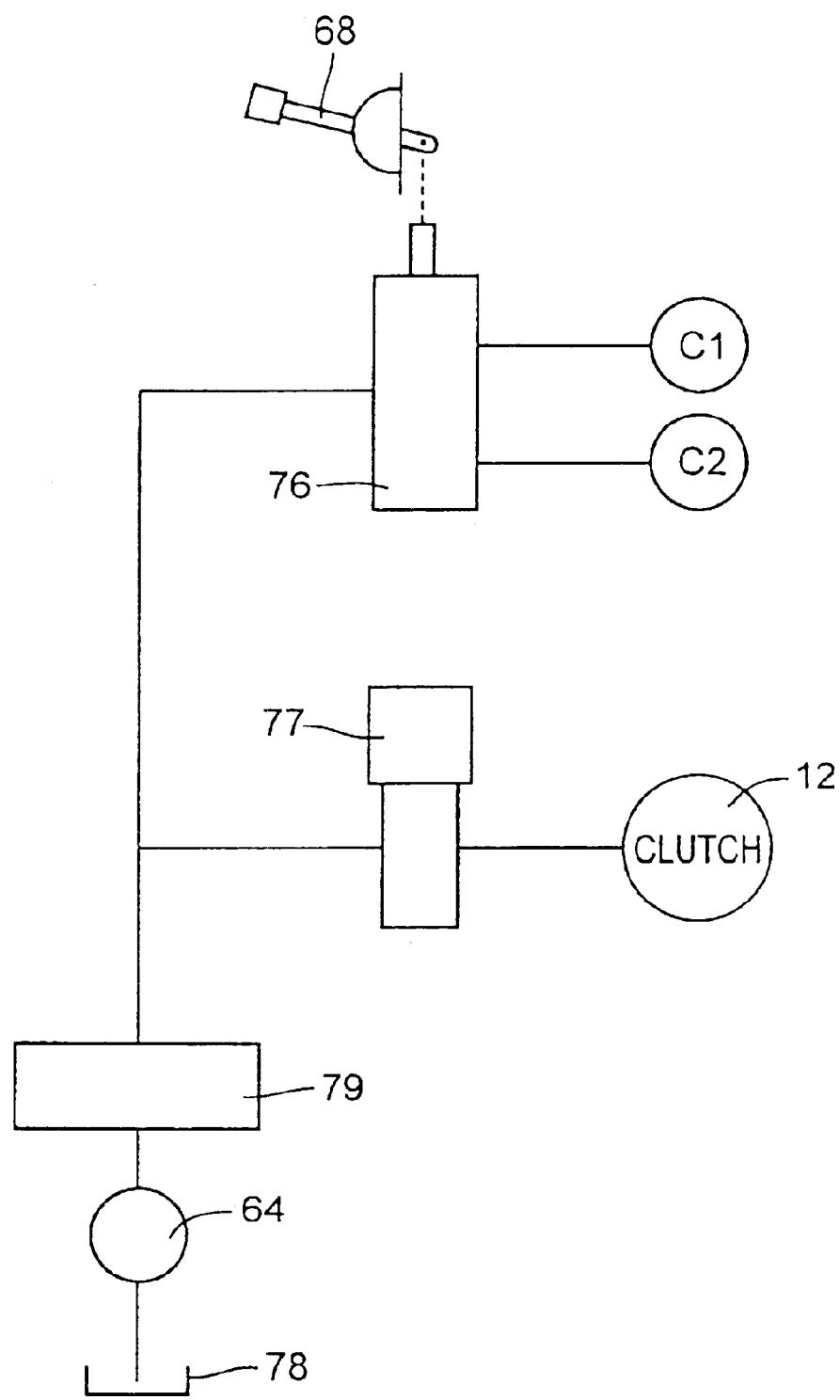
FIG. 4 is a view for explaining a part of a hydraulic control circuit provided in the vehicle of FIG. 1.

FIG. 4 is a view for explaining a portion of the hydraulic control circuit 66. The hydraulic pressure to be applied to the clutch C1 and C2 are controlled through a manual valve 76 which is mechanically connected to a shift lever 68 so that the manual valve 76 is operated in synchronization with an operation of the shift lever 68. The hydraulic pressure to be applied to the input clutch 12 disposed between and in series with the engine 10 and the torque converter 14 is directly controlled by an input clutch control valve 77. The working fluid returned to an oil tank 78 is pressurized by the electrically operated hydraulic pump 64. The pressure of the pressurized fluid delivered from the hydraulic pump 64 is regulated by a primary pressure regulator 79, and the thus regulated pressure is applied to the various hydraulically operated devices.

Figure 5:
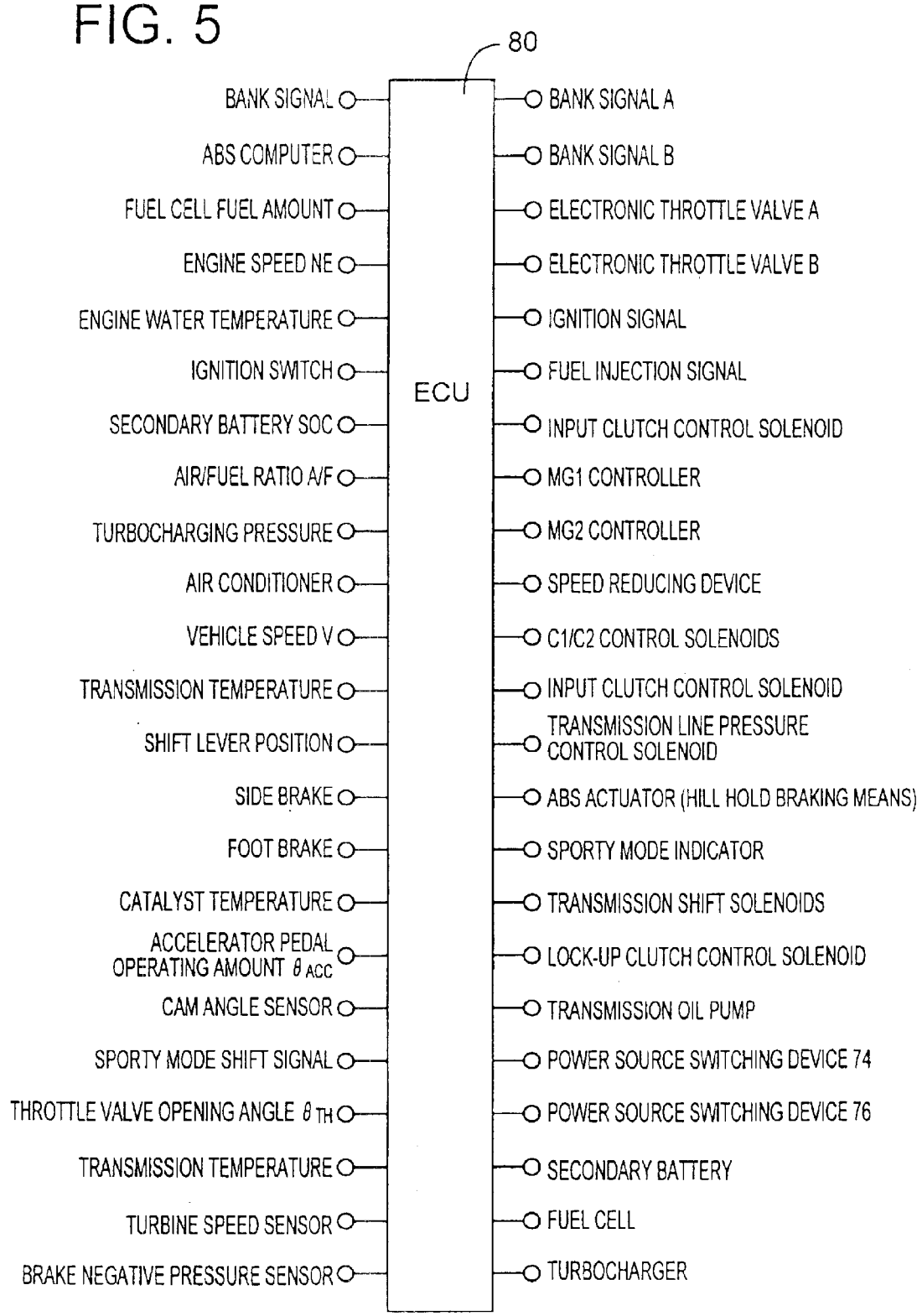
FIG. 5 is a view for explaining some of input and output signals of an electronic control device provided in the vehicle of FIG. 1.

FIG. 5 shows input signals to be received by an electronic control device 80 and output signals to be generated from the electronic control device 80. For example, the input signals to be received from various sensors (not shown) include an accelerator opening signal indicative of an operating angle $\theta_{ACC}$ of an accelerator pedal, a vehicle speed signal indicative of an operating speed $N_{OUT}$ of the output shaft 46 of the automatic transmission 16, a signal indicative of a operating speed $N_E$ of the engine, a signal indicative of a turbocharging pressure $P_{IN}$ in the intake pipe 50, a signal indicative of an air/fuel ratio A/F of an air-fuel mixture, and a signal indicative of a presently selected operating position $S_H$ of the shift lever. The output signals to be generated from the electronic control device 80 include a fuel injection signal for controlling an amount of fuel to be injected from the fuel injector valve into each cylinder of the variable-cylinder engine 10, signals for controlling solenoid coils for driving shift control valves incorporated in the hydraulic control unit 66, to shift the automatic transmission 16, and a signal for controlling a solenoid coil for driving a lock-up clutch control valve incorporated in the hydraulic control unit 66, to control the operating state of the lock-up clutch 26.

Figure 6:
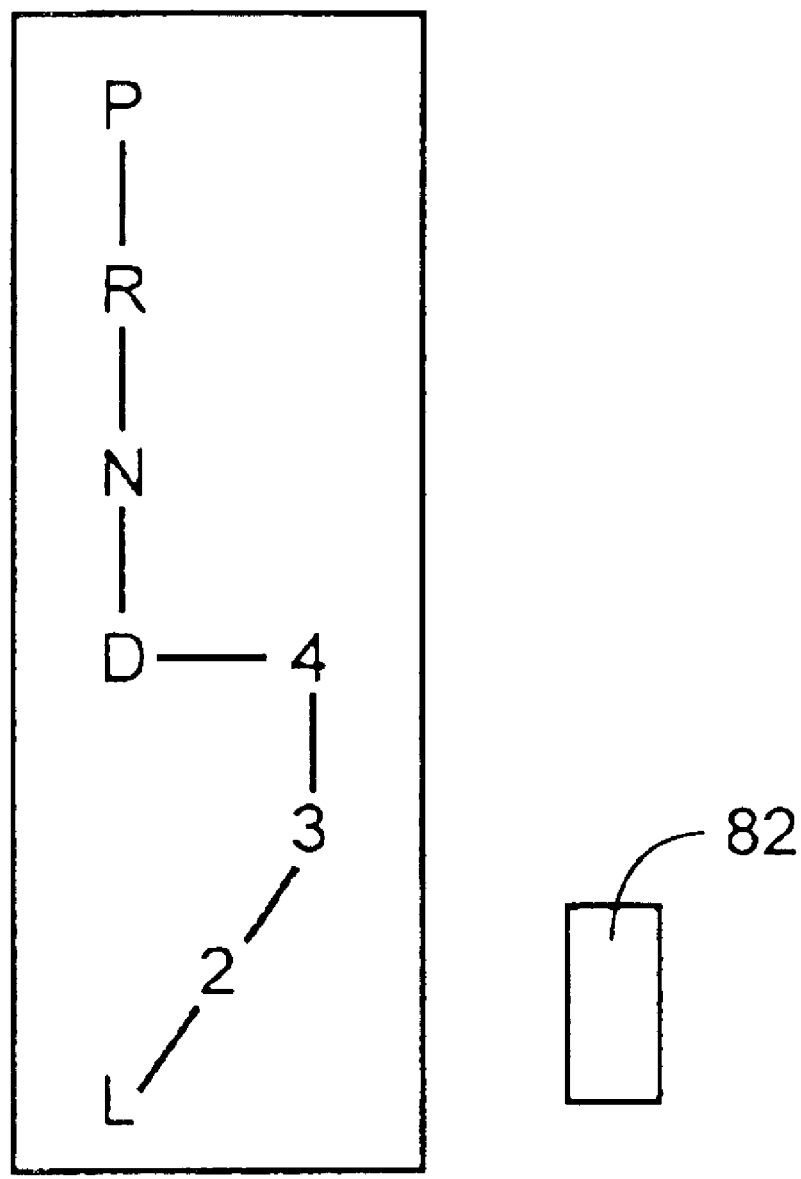
FIG. 6 is a view for explaining operating positions of a shift lever disposed near a console box provided in the vehicle, and a mode selector switch.

Referring next to FIG. 6, there is illustrated the operating positions of the shift lever, which is disposed near a console boxy provided on the vehicle. The shift lever is shifted to select one of the operating positions, that is, a position P, a position R, a position N, a position D, a position 4, a position 3, a position 2 and a position L. The shift lever is movably supported by a suitable support mechanism such that the above-indicated operating positions are arranged in the longitudinal position of the vehicle, such that the positions D and 4 are spaced apart from each other in the lateral or transverse direction of the vehicle. Further, the position 3 and the position 2 are located such that the shift lever is moved obliquely between these positions in a direction inclined with respect to the longitudinal direction, and the position 2 and the position L are located such that the shift lever is moved obliquely between these positions in the same inclined direction. The console box incorporates a mode selector switch 82 for selecting one of an AUTOMATIC SHIFT mode and a MANUAL SHIFT mode.

The electronic control device 80 includes a so-called microcomputer incorporating a CPU, a ROM, a RAM, and an input-output interface. The CPU operates to effect signal. processing operations according to control programs stored in the ROM, while utilizing a temporary data storage function of the RAM, for executing various control routines such as a drive-power-source switching control routine for controlling the operations of the variable-cylinder engine 10 and the MG1, a control routine for selectively placing the lock-up clutch 26 in an engaged state, a released state and a slipping state, and a shift control routine for controlling the shifting actions of the automatic transmission 26. For instance, the drive-power-source switching control routine is formulated to select one of an electric-motor operating area A, a partial-cylinder operating area B and a full-cylinder operating area C, on the basis of the actual vehicle running speed V and operating amount $\theta_{ACC}$ of the accelerator pedal, and according to a selected one of stored drive-power-source data maps of FIGS. 7–9. In the electric-motor operating area A, the MG1 is operated. In the partial-cylinder operating area B, only one of the two banks 10A and 10B is operated. In the full-cylinder operating state C, both of the two banks 10A and 10B are operated. Depending upon the selected one of the operating states A, B and C, the appropriate drive power source is operated. That is, the MG1, or one or both of the two banks of the variable-cylinder engine 10 is/are operated. The shift control routine is formulated to select one of the operating positions of the automatic transmission 16, on the basis of the operating amount $\theta_{ACC}$ (%) of the accelerator pedal and the vehicle running speed V, and according to stored predetermined relationships (shift boundary lines) of FIGS. 7–9 between the operating amount and vehicle running speed V and the operating positions to be selected. The solenoid coils of the shift control valves provided in the hydraulic control circuit 66 are controlled to shift the automatic transmission 16 to the selected operating position.

Figure 7:
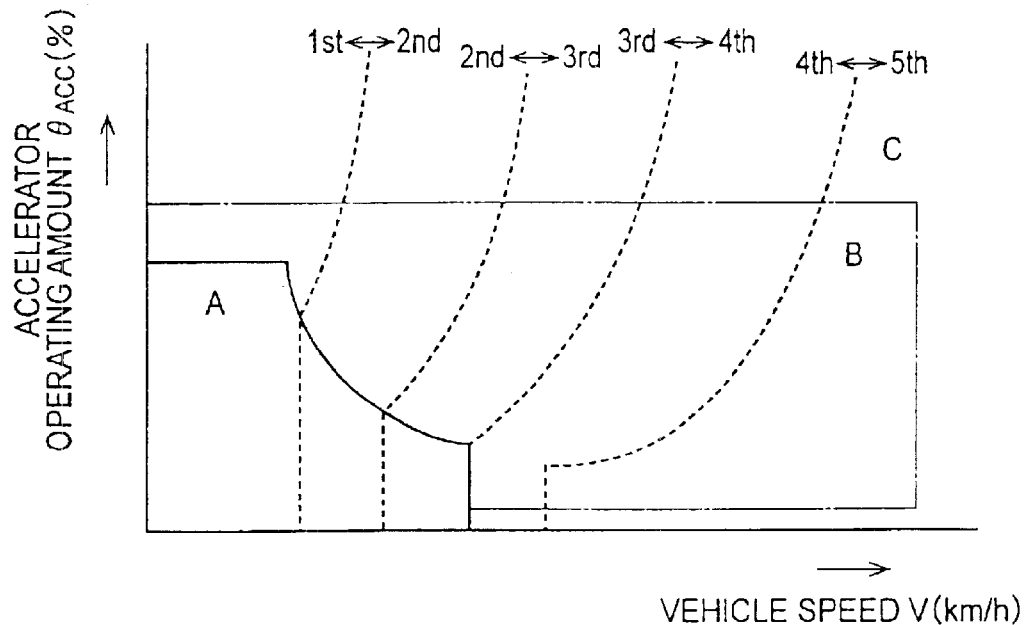
FIG. 7 is a view showing a drive-power-source data map which is used to select a drive power source on the basis of vehicle running speed and throttle valve opening angle, while MG1 is operable with an electric energy supplied from a fuel cell, to provide a sufficiently large output torque as an assisting drive force.

The drive-power-source data map shown in FIG. 7 is used while MG1 is operable with an electric energy supplied from the fuel cell, to provide a sufficiently large output torque as an assisting drive force. This data map provides a broadest partial-cylinder operating area B in which the total vehicle drive torque which is a sum of the output torque of the operated one of the two banks of the variable-cylinder engine 10 and the output torque of the MG1 is comparatively large. The variable-cylinder engine 10 provides its maximum output torque when both of its two banks are operated, and the output torque of the engine 10 when one of its two banks is operated is a half of the maximum output torque. The drive-power-source data map of FIG. 7 is formulated so as to effectively utilize the output torque of the MG1 as an assisting torque to be added to the output torque of the operated one of the two banks of the variable-cylinder engine 10, thereby permitting an operation of the variable-cylinder engine 10 in the partial-cylinder operating state even when the operating amount $\theta_{ACC}$ of the accelerator pedal is relatively large, so that the fuel economy of the engine 10 is improved by reducing a loss in the partial-cylinder operating state. The reduction of this loss is obtained by not only reducing the amount of fuel injected into the engine 10 by reducing the number of the operating cylinders, but also reducing the pump loss of the non-operating cylinders placed in the decompression state.

Figure 8:
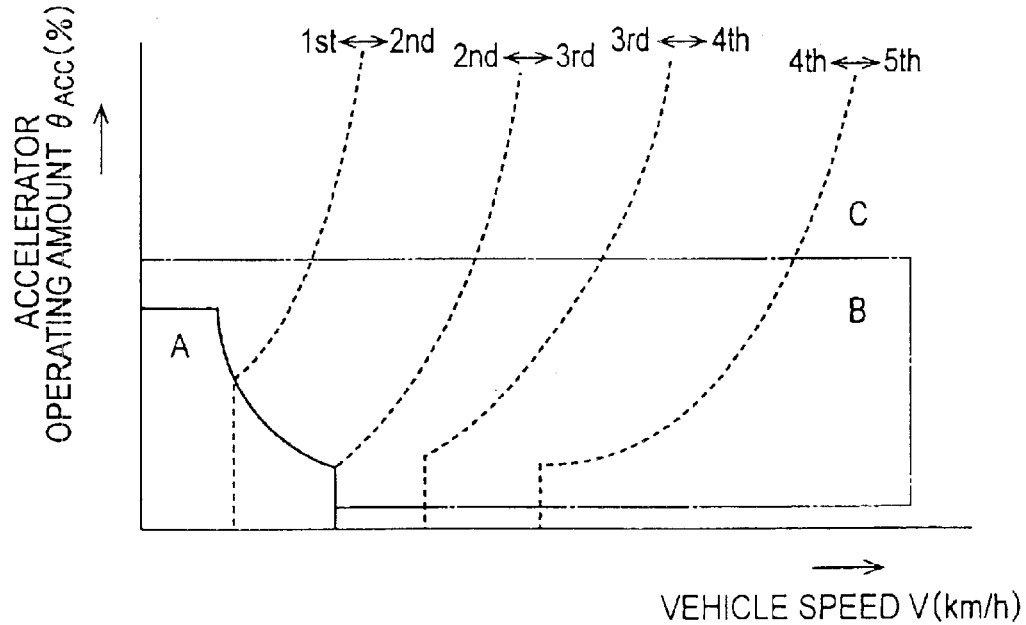
FIG. 8 is a view showing a drive-power-source data map which is used to select the drive power source on the basis of the vehicle running speed and the throttle valve opening angle, while the MG1 is not operable with an electric energy supplied from the fuel cell, to provide a sufficiently large output torque as the assisting drive force.
Figure 9:
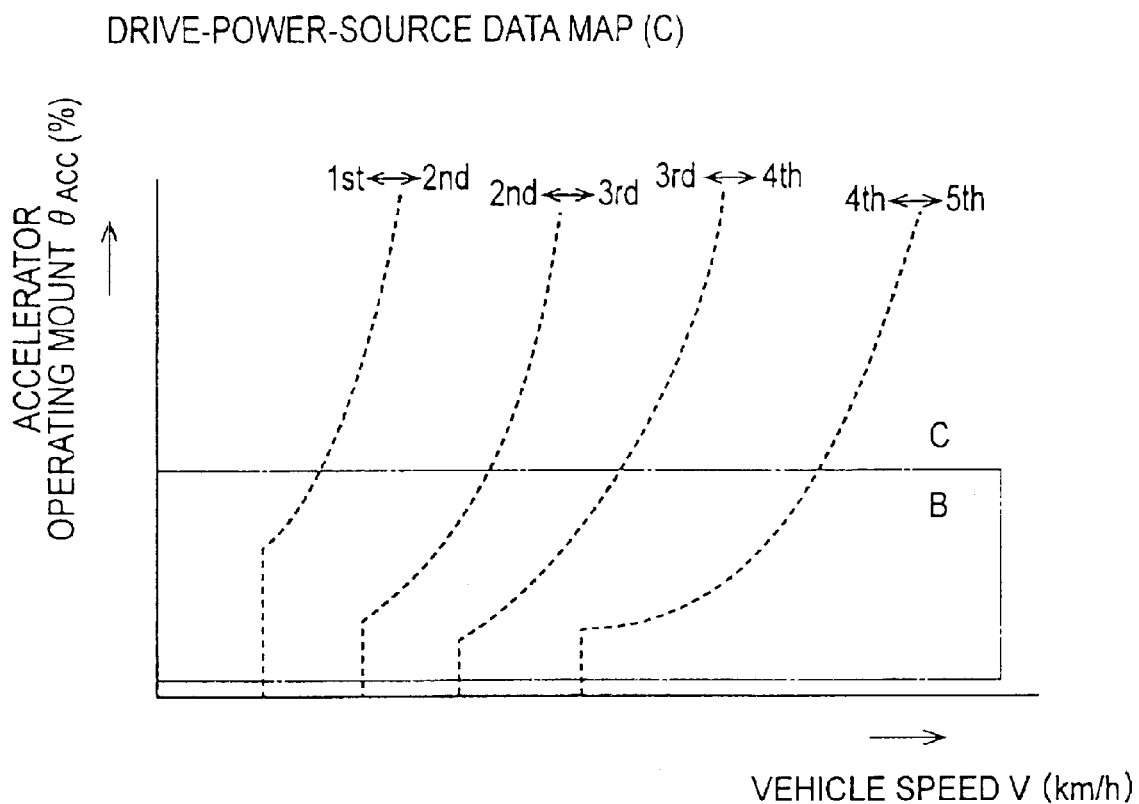
FIG. 9 is a view showing a drive-power-source data map which is used to select the drive power source on the basis of the vehicle running speed and the throttle valve opening angle, while the output torque provided by the MG1 operated with an electric energy supplied from the fuel cell is not at all sufficient as the assisting drive force.

The drive-power-source data map shown in FIG. 8 is used while the MG1 is not operable with an electric energy supplied from the fuel cell, to provide a sufficiently large output torque as the assisting drive force. According to this drive-power-source data map, the dimension of the partial-cylinder operating area B as measured in the direction of the operating amount $\theta_{ACC}$ of the accelerator pedal is slightly smaller than that of the data map of FIG. 7. Further, the electric-motor operating area A in which the MG1 alone is operated while the variable-cylinder engine 10 is at rest is made narrower than that according to the data map of FIG. 7. The drive-power-source data map shown in FIG. 9 is used while the output torque provided by the MG1 operated with an electric energy supplied from the fuel cell is not at all sufficient as the assisting drive force, due to a shortage of a fuel available for the fuel cell or due to overheating of the fuel cell.

Figure 10:
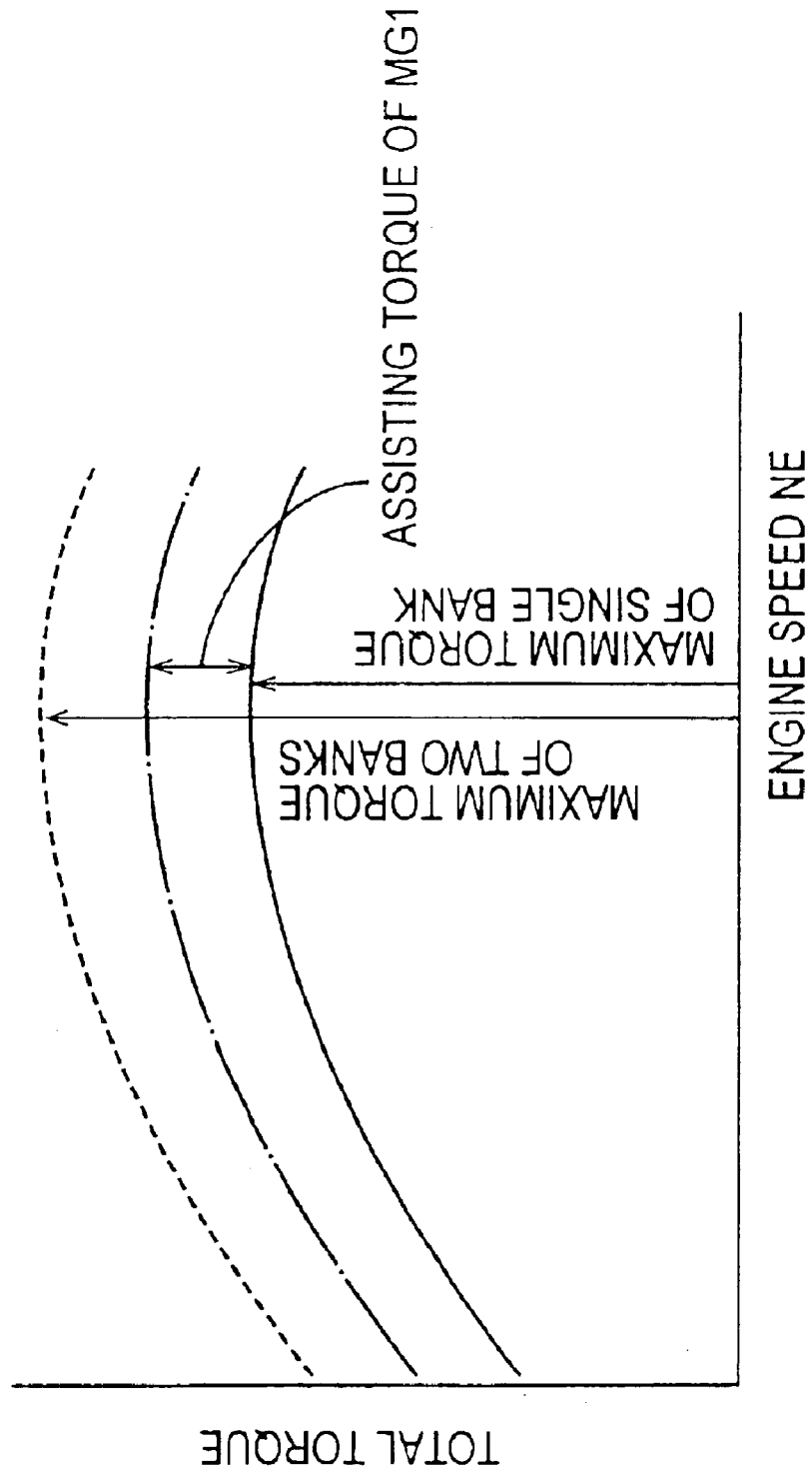
FIG. 10 is a view indicating output torque characteristics of variable-cylinder engine when the engine is placed in a two-bank operating state and in a single-bank operating state.
Figure 11:
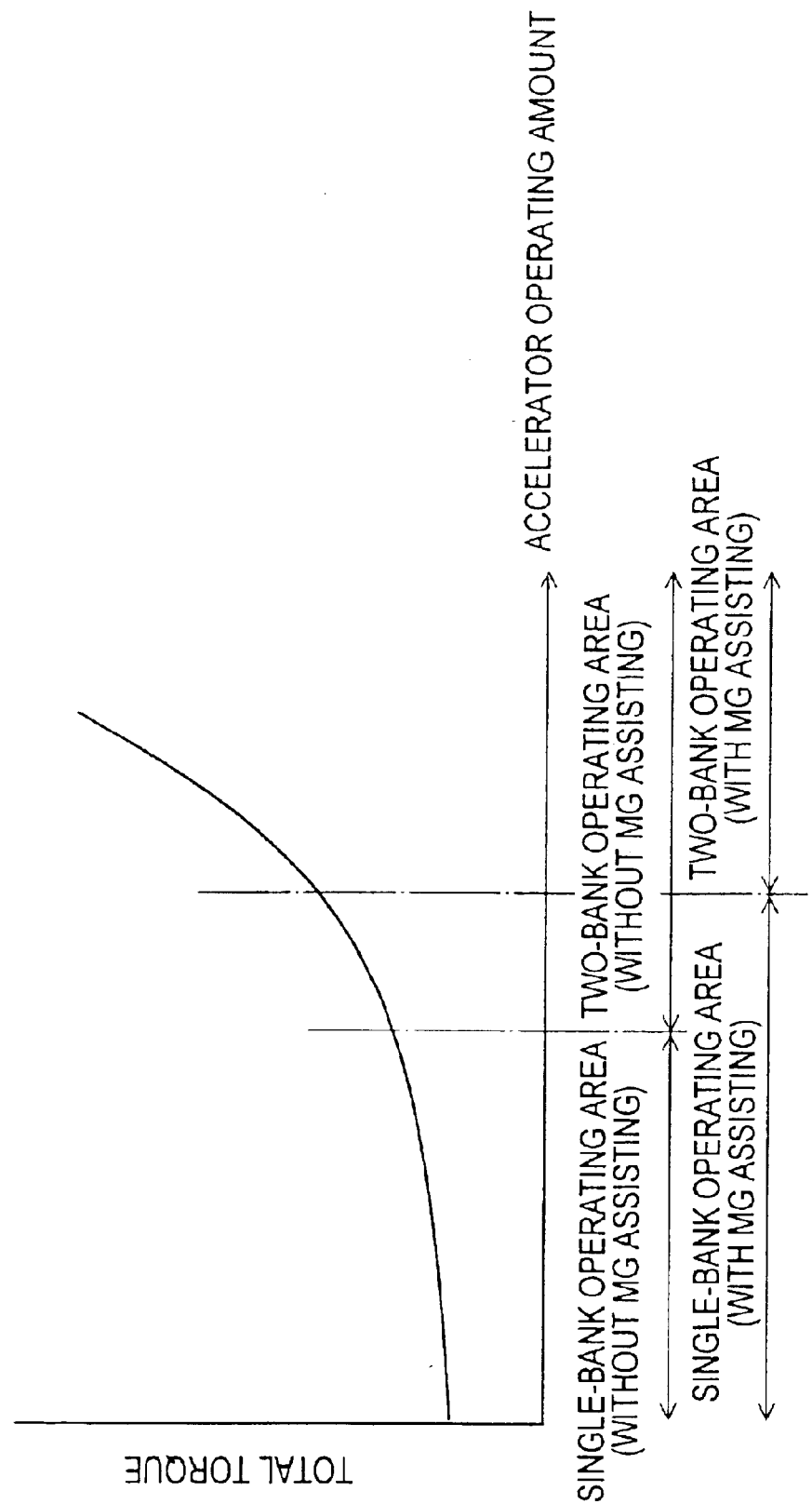
FIG. 11 is a view indicating a total torque characteristic of the variable-cylinder engine, in relation to accelerator operating amount.

In FIG. 10, an output torque characteristics of the variable-cylinder engine 10 when the engine 10 is placed in a single-bank operating state is indicated by solid line, while that in a two-bank operating state of the engine 10 is indicated by broken line. One-dot chain line in FIG. 10 indicates the total torque which is a sum of the output torque of the engine 10 in the one-bank operating state and the output torque (assisting torque) of the MG1, and which corresponds to the operating amount $\theta_{ACC}$ of the accelerator pedal. Accordingly, the single-bank operating area is enlarged by utilizing the output torque of the MG1 as the assisting torque. It is also noted that even when the operating amount $\theta_{ACC}$ of the accelerator pedal is smaller than a predetermined value, the vehicle is driven with the engine 10 placed in the two-bank operating state, where the single-bank operation of the engine 10 is not available, for instance, where regular switching of the left and right banks is not possible during warm-up operation of the engine 10, for instance. FIG. 11 is a view indicating a total torque characteristic of the variable-cylinder engine 10, in relation to the operating amount $\theta_{ACC}$ of the accelerator pedal. Namely, FIG. 11 indicates that the assisting torque provided by the MG1 permits the single-bank operating area to be enlarged in relation to the operating amount $\theta_{ACC}$ of the accelerator pedal.

Figure 12:
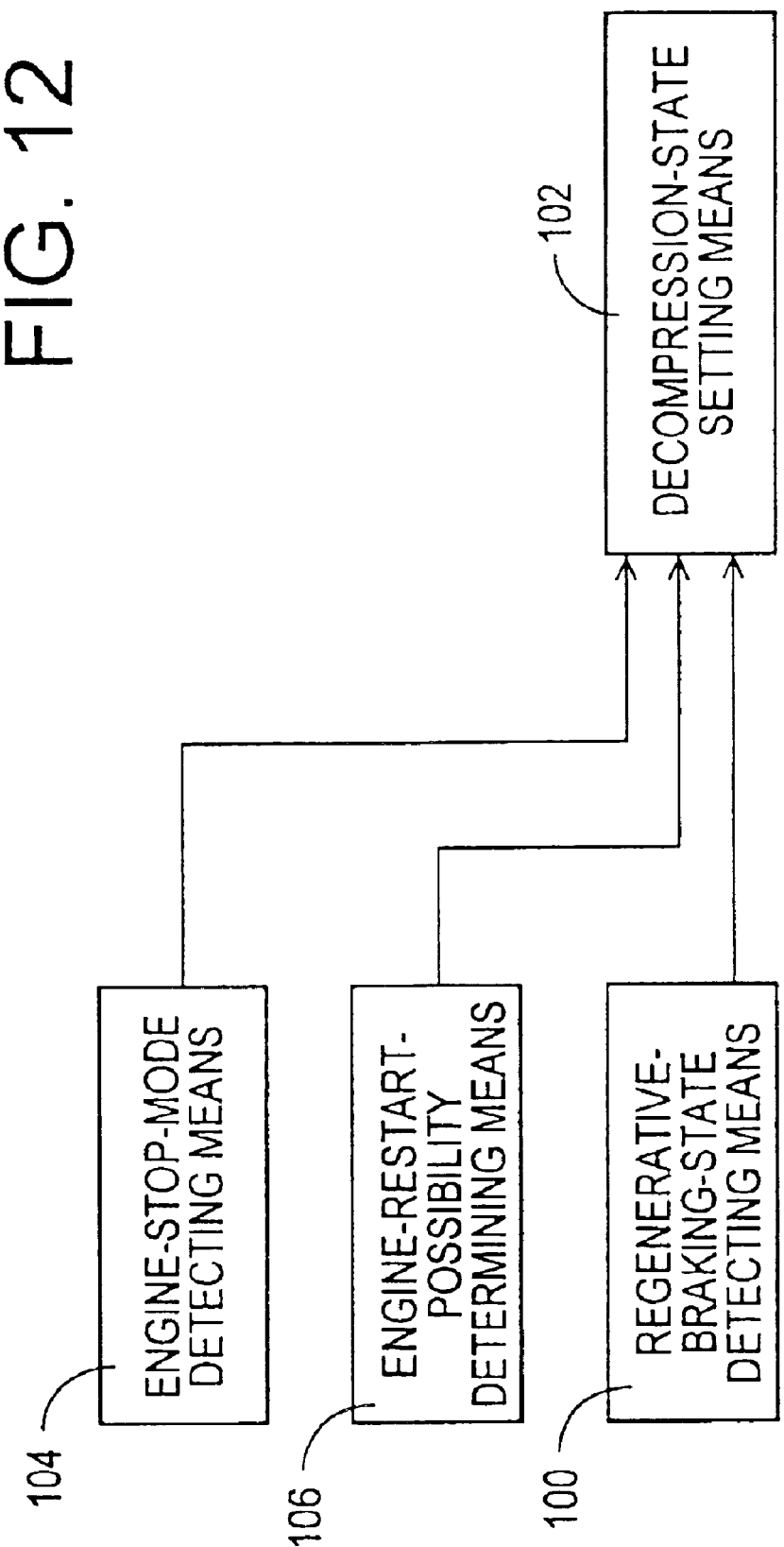
FIG. 12 is a block diagram illustrating some of functional means of the electronic control device of FIG. 5.

FIG. 12 is a block diagram illustrating some of functional means of the above-indicated electronic control device 80, namely, functional means for selecting the drive power source. Regenerative-braking-state detecting means 100 shown in FIG. 12 is arranged to determine whether the vehicle is placed in a regenerative braking state in which the MG1 is operated with a kinetic energy of the vehicle, to generate an electric energy for charging the secondary battery 72, during deceleration of the vehicle (during running of the vehicle with braking by the drive power source) or during normal braking of the vehicle. The regenerative-braking-state detecting means 100 may be arranged to determine the amount of the electric energy generated by the regenerative braking. Decompression sate setting means 102 is arranged to place appropriate ones of the non-operating cylinders of the variable-cylinder engine 10 in the decompression state, on the basis of the regenerative braking state detected by the regenerative-braking-state detecting means 100.

Engine-stop-mode detecting means 104 is arranged to determine whether the vehicle is running in an engine-stop running mode with the variable-cylinder engine 10 being held at rest, that is, whether the vehicle is coasting with the fuel supply to the engine 10 being cut off while the vehicle running speed V is higher than a predetermined fuel-cut threshold. Engine-restart-possibility determining means 106 is arranged to determine whether there is a possibility that the variable-cylinder engine 10 is restarted during running of the vehicle in the engine-stop running mode. During a normal running of the vehicle, the engine-restart-possibility determining means 106 usually determines that there is a possibility of restarting of the variable-cylinder engine 10. The decompression-state setting means 102 indicated above places the bank 10A of the variable-cylinder engine 10 in the compression state and placing the other bank 10B in the decompression state, in the regenerative braking state of the vehicle when the engine-stop-mode detecting means 104 determines that the variable-cylinder 10 is held at rest and when the engine-restart-possibility detecting means 106 determines that there is a possibility of the engine 10 being restarted. However, the decompression-state setting means 102 places both of the two banks 10A and 10B in the decompression state, in the regenerative braking state of the vehicle when the variable-cylinder engine 10 is detected to be held at rest but when there is not a possibility that the engine 10 is restarted.

Figure 13:
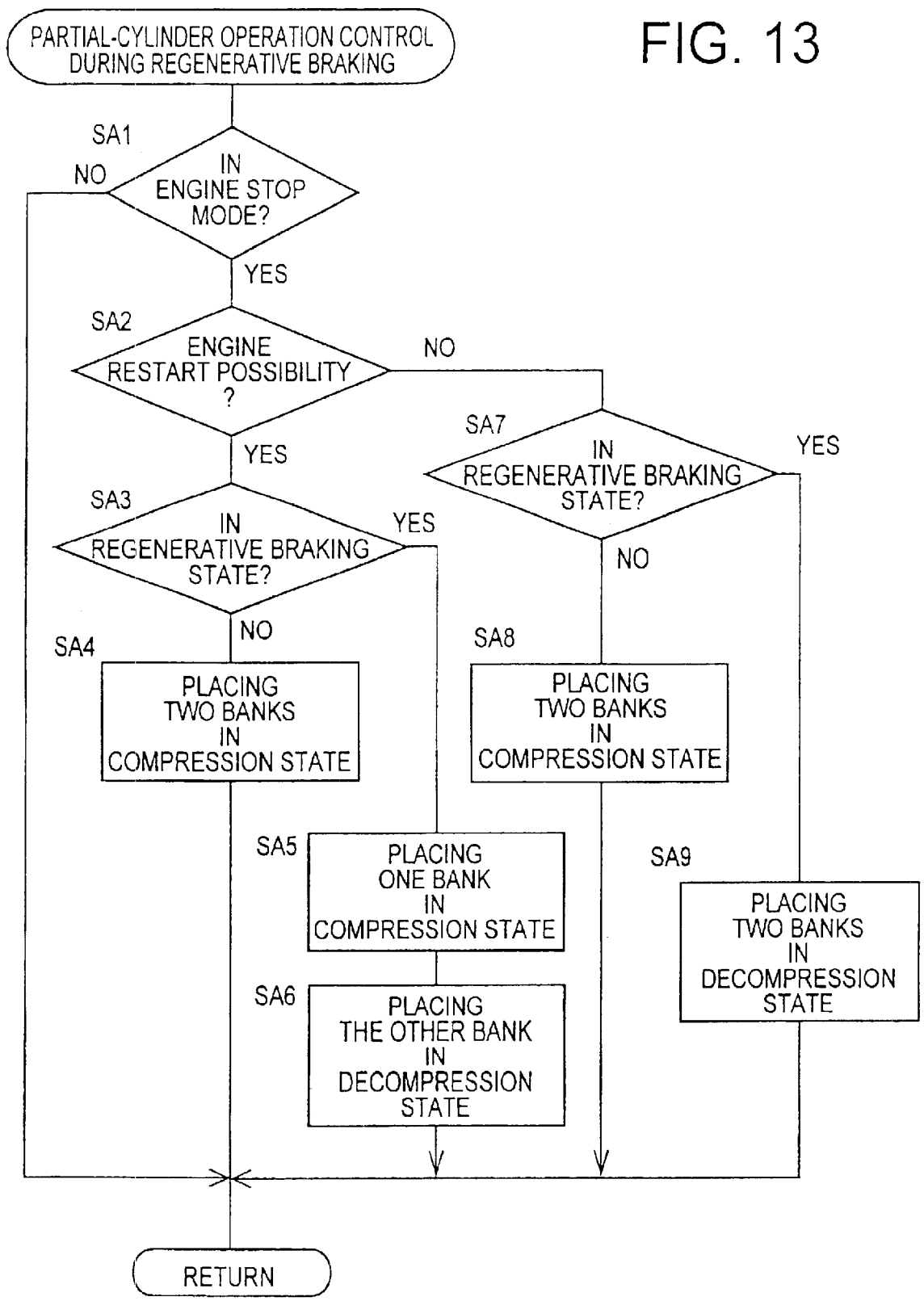
FIG. 13 is a flow chart illustrating a part of a control operation of the electronic control device of FIG. 5.
Figure 14:
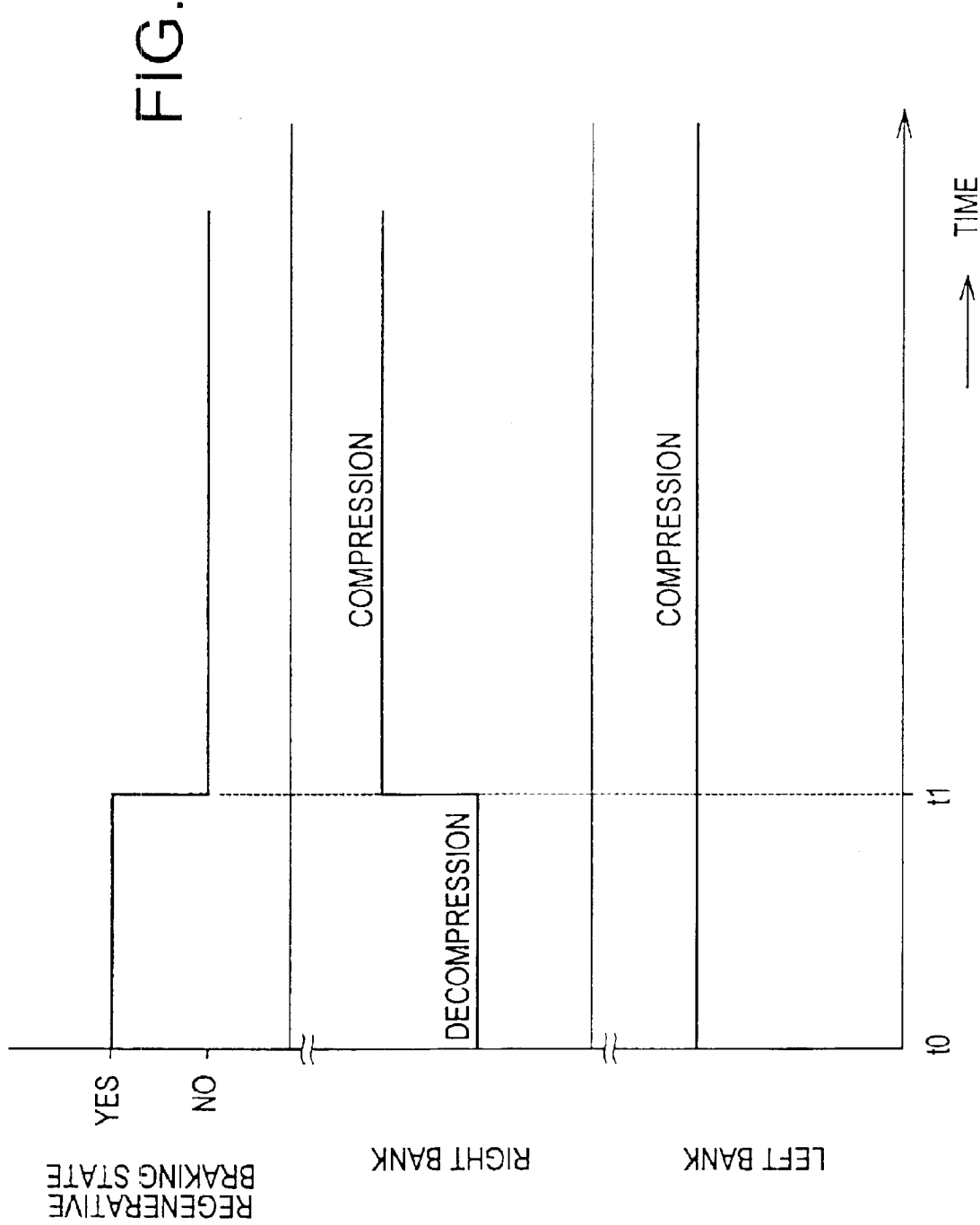
FIG. 14 is a time chart for explaining the control operation of the electronic control device of FIG. 5.

Referring to the flow chart of FIG. 13 illustrating a part of a control operation of the electronic control device 80, this control operation is repeatedly performed with a predetermined cycle time. The control operation is initiated with step SA1 corresponding to the engine-stop-mode detecting means 104, to determine whether the vehicle is running in the engine-stop running mode with the variable-cylinder engine 10 being held at rest, that is, whether the vehicle is coasting with the fuel supply to the engine 10 being cut off, at the running speed V higher than the predetermined fuel-cut threshold. Hereinafter, the word "step" as in step SA1 will be omitted. If a negative decision is obtained in SA1, one cycle of execution of the present control routine is terminated. If an affirmative decision is obtained in SA1, the control flow goes to SA2 corresponding to the engine-restart-possibility detecting means 106, to determine whether there is a possibility that the variable-cylinder 10 presently at rest during running of the vehicle will be restarted. Normally, an affirmative decision is obtained in SA3, and the control flow goes to SA3 corresponding to the regenerative-braking-state detecting means 100, to determine whether the vehicle is in the regenerative braking state in which the MG1 is operated with a kinetic energy of the running vehicle to generate an electric energy for charging the secondary battery 72. If a negative decision is obtained in SA3, all of the cylinders or the two banks of the variable-cylinder engine 10 are placed in the compression state, so that the resistance of the engine 10 to rotary motion thereof and the braking torque are increased. If an affirmative decision is obtained in SA3, the control flow goes to SA5 to place some of the cylinders of the variable-cylinder engine 10, that is, the bank 10A, in the compression state, and place the other cylinders, that is, the bank 10B, in the decompression state, so that the amount of electric energy generated by the regenerative braking and the regenerative braking torque are increased, and so that the variable-cylinder engine 10 can be ignited or restarted in a short time. In the example of FIG. 14, this state of the engine 10 is established for a time period between points of time $t_0$ and $t_1$.

If a negative decision is obtained in step SA2, the control flow goes to SA7 also corresponding to the regenerative-braking-state detecting means 100 and similar to SA3, to determine whether the vehicle in placed in the regenerative braking state. If a negative decision is obtained in SA7, the control flow goes to SA8 similar to SA4, to place all cylinders or both banks of the variable-cylinder engine 10 in the compression state. If an affirmative decision is obtained in SA7, the control flow goes to SA9 to place all cylinders or both banks of the variable-cylinder engine 10 in the decompression state. In the present embodiment, SA4 through SA6, and SA8 and SA9 correspond to the decompression-state setting means 102. The compression state is a state in which the intake air in the cylinder is compressed in the compression stroke of the four-cycle engine, with the operating timings of the intake and exhaust valves being controlled as in the normal operation. The decompression state is a state in which the intake air in the compression stroke of the four-cycle engine is not sufficiently compressed, with the operating timing of the intake or exhaust valve being changed with respect to the normal timing, and with the throttle valve 62 and an EGR valve (not shown) being released to reduce the resistance to a rotary motion of the crankshaft.

Figure 15:
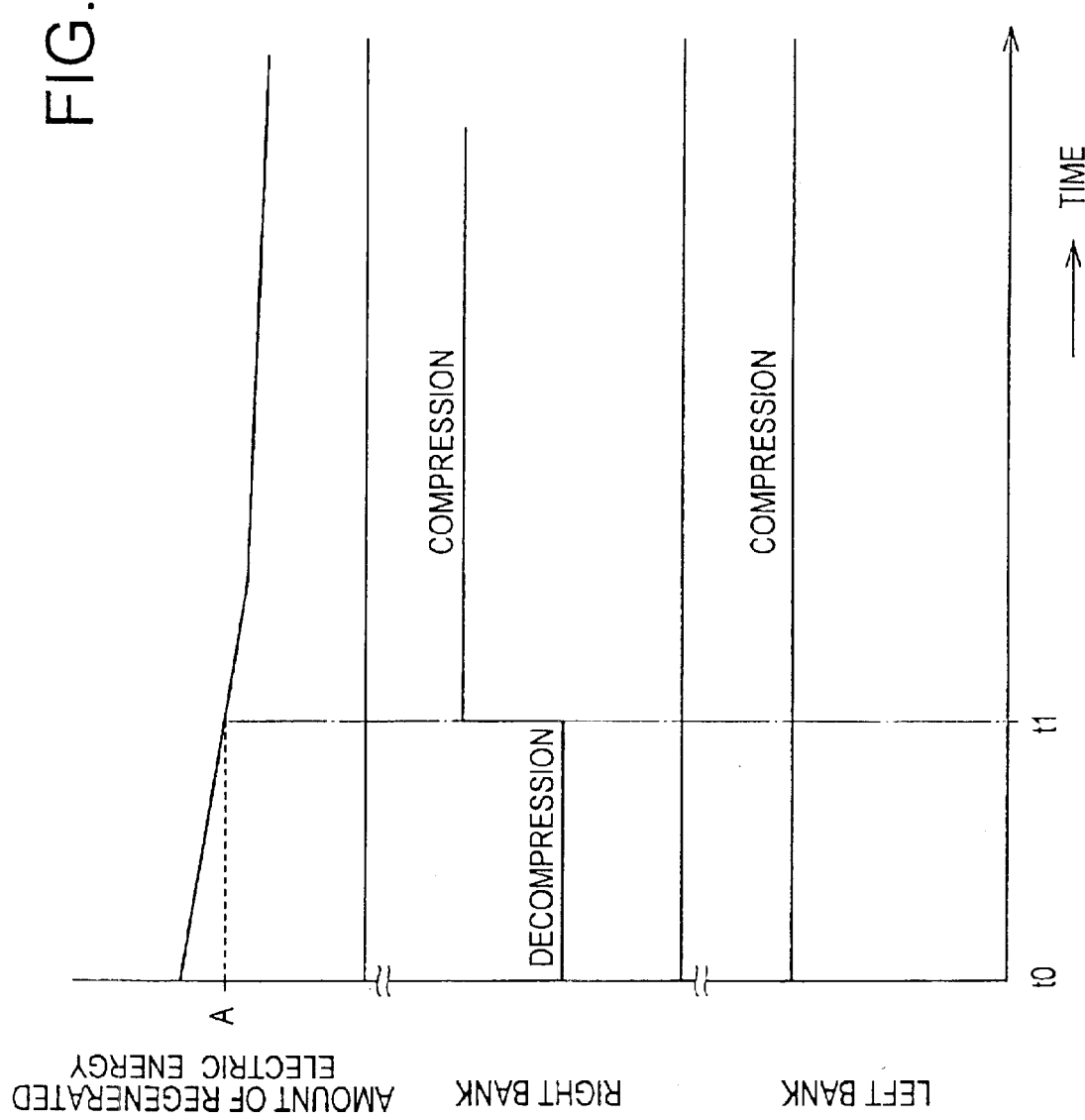
FIG. 15 is a time chart for explaining the control operation of the electronic control device of FIG. 5, in another state of the vehicle.

When the regenerative braking is terminated due to full charging of the secondary battery 72, for example, a negative decision is obtained in SA3 or SA7, and the two banks of the variable-cylinder engine 10 are placed in the compression state. In the example of FIG. 14, this state is established for a time period after a point of time $t_1$. While SA3 and SA7 are formulated to determine whether the vehicle is in the regenerative braking state, these steps may be formulated to detect the amount of electric energy generated by the regenerative braking, and establish the compression or decompression state of each bank of the variable-cylinder engine 10, depending upon whether the detected amount of electric energy is larger than a predetermined value. In the example illustrated in the time chart of FIG. 15, the variable-cylinder engine 10 is controlled to be selectively placed in the compression or decompression state depending upon whether the detected amount of electric energy generated by the regenerative braking is reduced below a predetermined threshold value A. That is, the two banks of the variable-cylinder engine 10 are placed in the compression state at a point of time $t_1$ at which the detected amount has becomes smaller than the threshold value A.

In the present embodiment which has been described, the decompression-state setting means 102 (SA5, SA6) is arranged to place appropriate ones of the non-operating cylinders of the variable-cylinder engine 10 in the decompression state, on the basis of the regenerative braking state of the vehicle detected by the regenerative-braking-state detecting means 100 (SA3), so that only a required minimum number of the non-operating cylinders of the variable-cylinder engine 10 is/are placed in the decompression state, depending upon the detected regenerative braking state of the vehicle, making it possible to not only improve the fuel economy of the vehicle but also assure sufficient engine braking of the vehicle.

In the present embodiment, the variable-cylinder engine 10 has a pair of banks 10A and 10B each of which has a plurality of cylinders and which are operable independently of each other. The decompression-state setting means 102 (SA4, SA5, SA6) is further arranged to place both of the two banks of the variable-cylinder engine 10 in the compression state when the regenerative-braking-state detecting means 100 has not detected a regenerative braking state of the vehicle, and place one of the two banks of the variable-cylinder engine 10 in the compression state and the other bank in the decompression state when the regenerative-braking-state detecting means 100 has detected a regenerative braking state of the vehicle. In the decompression state, the cylinder chamber is in a non-compressed state even in the compression stroke. While the vehicle is not placed in a regenerative braking state, the drive power source (engine) provides an appropriate braking effect since the two banks are both placed in the compression state. While the vehicle is placed in a regenerative braking state, on the other hand, the braking effect provided by the drive power source (engine) is reduced by an amount corresponding to the amount of regenerative braking effect, since one and the other of the two banks are placed in the compression state and the decompression state, respectively, so that the total braking effect applied to the vehicle is substantially equal to that while the vehicle is not placed in the regenerative braking state, and the fuel economy is improved owing to the regeneration of an electric energy in the regenerative braking state.

In the present embodiment, the engine-stop-mode detecting means 104 (SA1) is provided for determining whether the vehicle is running in an engine-stop running mode, for instance, in a motor-drive mode or a fuel-cut mode, with the variable-cylinder 10 being held at rest, and the regenerative-braking-state detecting means 100 is operated to detect the regenerative braking effect of the vehicle, when the engine-stop-mode detecting means 100 has detected that the vehicle is running in the engine-stop running mode. This arrangement is effective to improve the fuel economy of the vehicle and assure a sufficient engine braking effect, while the vehicle is running in the regenerative braking state and in the engine-stop mode with the variable-cylinder engine being held at rest.

In the present embodiment, the engine-restart-possibility determining means 106 (SA2) is provided for determining whether there is a possibility that the variable-cylinder engine 10 will be restarted, and the regenerative-braking-state detecting means 100 is operated to detect the regenerative braking state of the vehicle, when the engine-restart-possibility determining means determines that there is a possibility that the variable-cylinder engine will be restarted. The decompression-state setting means 102 is arranged to place one (10A) of the banks of the variable-cylinder engine 10 in the compression state and the other bank (10B) in the decompression state, when the regenerative-braking-state detecting means 100 has detected a regenerative braking state of the vehicle. In the regenerative braking state of the vehicle, therefore, one (10A) of the banks is placed in the compression state so that the variable-cylinder engine 10 can be restarted in a short time when the engine is commanded to be restarted.

The present embodiment is further arranged such that when the engine-restart-possibility determining means determines that there is not a possibility that the variable-cylinder engine 10 will be restarted, the decompression-state setting means 102 places both banks of the variable-cylinder engine 10 in the compression state if the regenerative-braking-state detecting means has not detected a regenerative braking state of the vehicle, and places both banks of the variable-cylinder engine 10 in the decompression state if the regenerative-braking-state detecting means has detected a regenerative braking state of the vehicle. This arrangement is advantageous in that an adequate engine braking effect is obtained while the vehicle is not placed in a regenerative braking state in which both banks are placed in the compression state, and that the amount of electric energy generated by the regenerative braking is maximized while the vehicle is placed in the regenerative braking state in which both banks are placed in the decompression state.

Then, another embodiment of this invention will be described. In the foregoing description, the same reference signs as used in the preceding embodiment will be used to identify the same elements.

Figure 16:
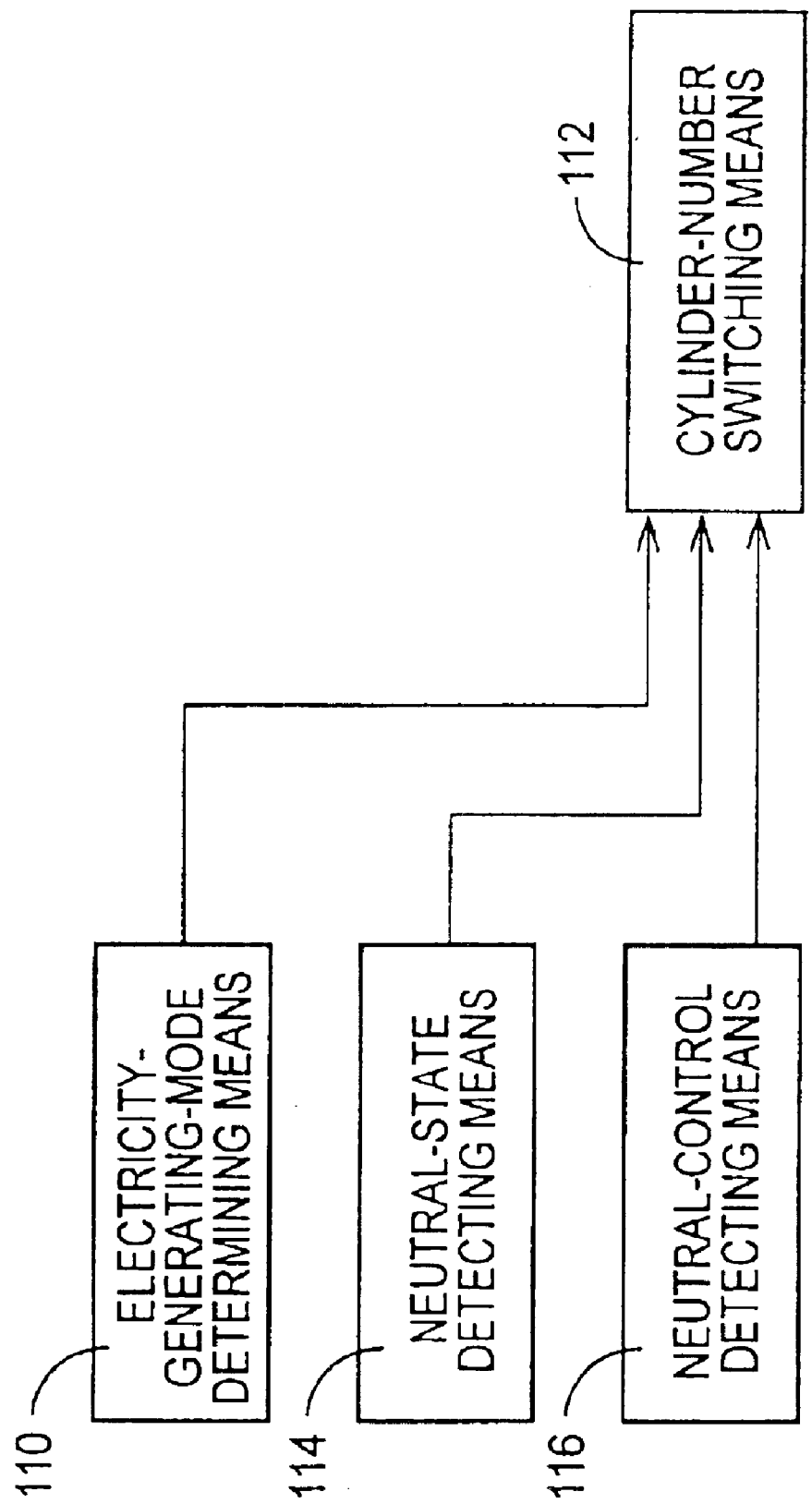
FIG. 16 is a block diagram illustrating some of functional means of an electronic control device in another embodiment of this invention.

FIG. 16 is a block diagram illustrating other functional means of the electronic control device 80. Electricity-generating-mode determining means 110 indicated in FIG. 16 is arranged to determine whether it is required to establish an electricity generating mode in which the MG1 or MG2 is operated as an electric generator to generate an electric energy. For instance, this determination may be effected by determining whether the amount of electric energy left in the secondary battery 72 is smaller than a predetermined value. Cylinder-number switching means 112 is operable, when the electricity-generating-mode determining means 110 determines that the electricity generation by the MG1 or MG2 is required, to place the variable-cylinder engine 12 in the partial-cylinder operating state (reduced-cylinder operating state), so that the MG1 or MG2 is operated by the variable-cylinder engine 10 placed in the single-bank operating state, for example.

Neutral-state detecting means 114 is arranged to determine whether a power-transmitting path between the variable-cylinder engine 10 and the drive wheels is in a cut-off state. For example, this determination may be effected by determining whether the shift lever not shown is placed in any non-drive position such as the neutral position (N) or parking position (P), or whether the automatic transmission 16 is placed in a neutral state. Neutral-control detecting means 116 is arranged, for instance, to determine whether the vehicle is placed in a neutral control mode in which the clutch 12 is in the released state. The cylinder-number switching means 112 causes the MG1 or MG2 to be operated by the variable-cylinder engine 10 placed in the single-bank operating state, when the neutral-state detecting means 114 determines that the power-transmitting path is placed in the cut-off state, or when the neutral-control detecting means 116 determines that the clutch 12 is placed in the released state.

Figure 17:
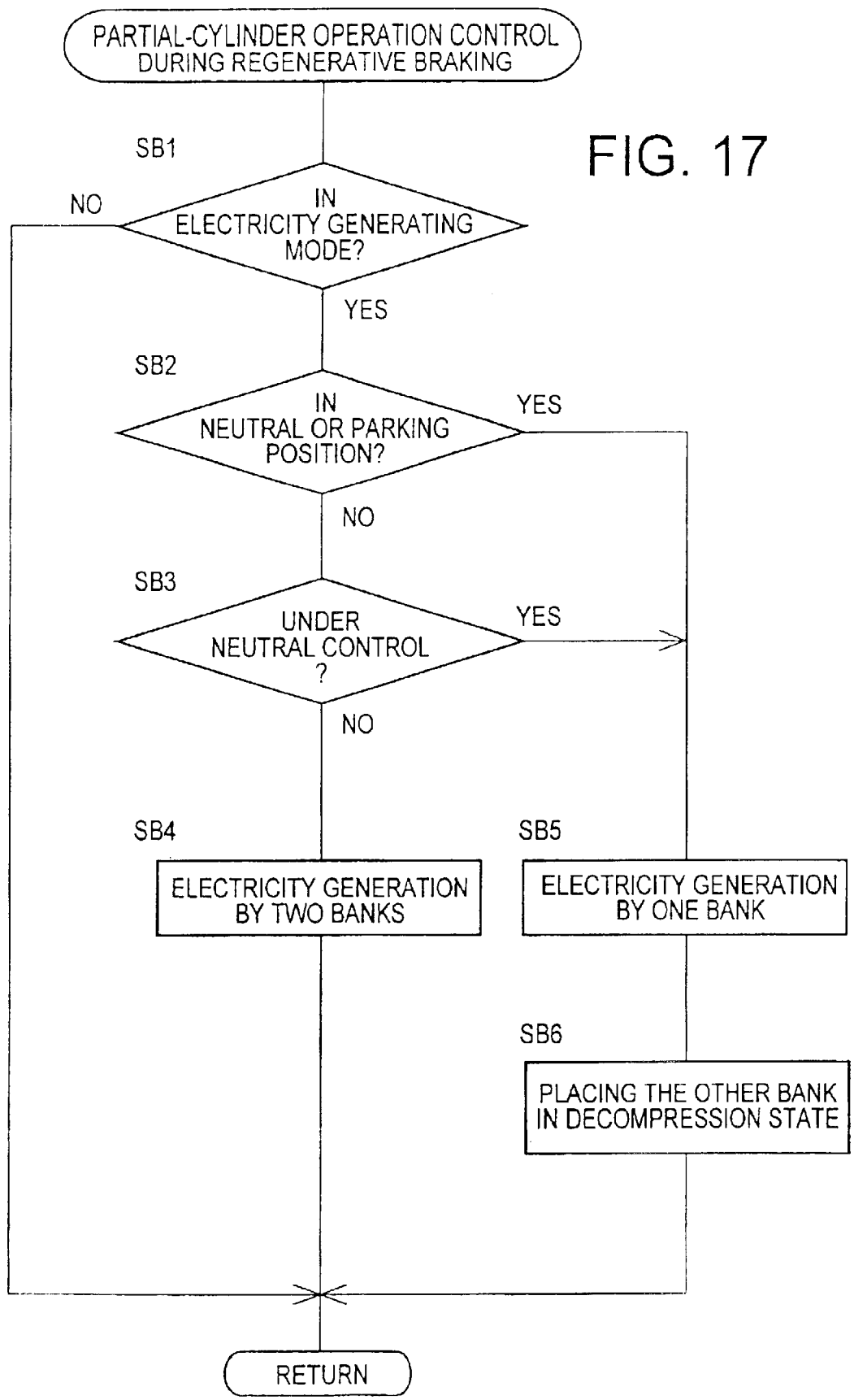
FIG. 17 is a flow chart illustrating a part of a control operation of the electronic control device of FIG. 16.
Figure 18:
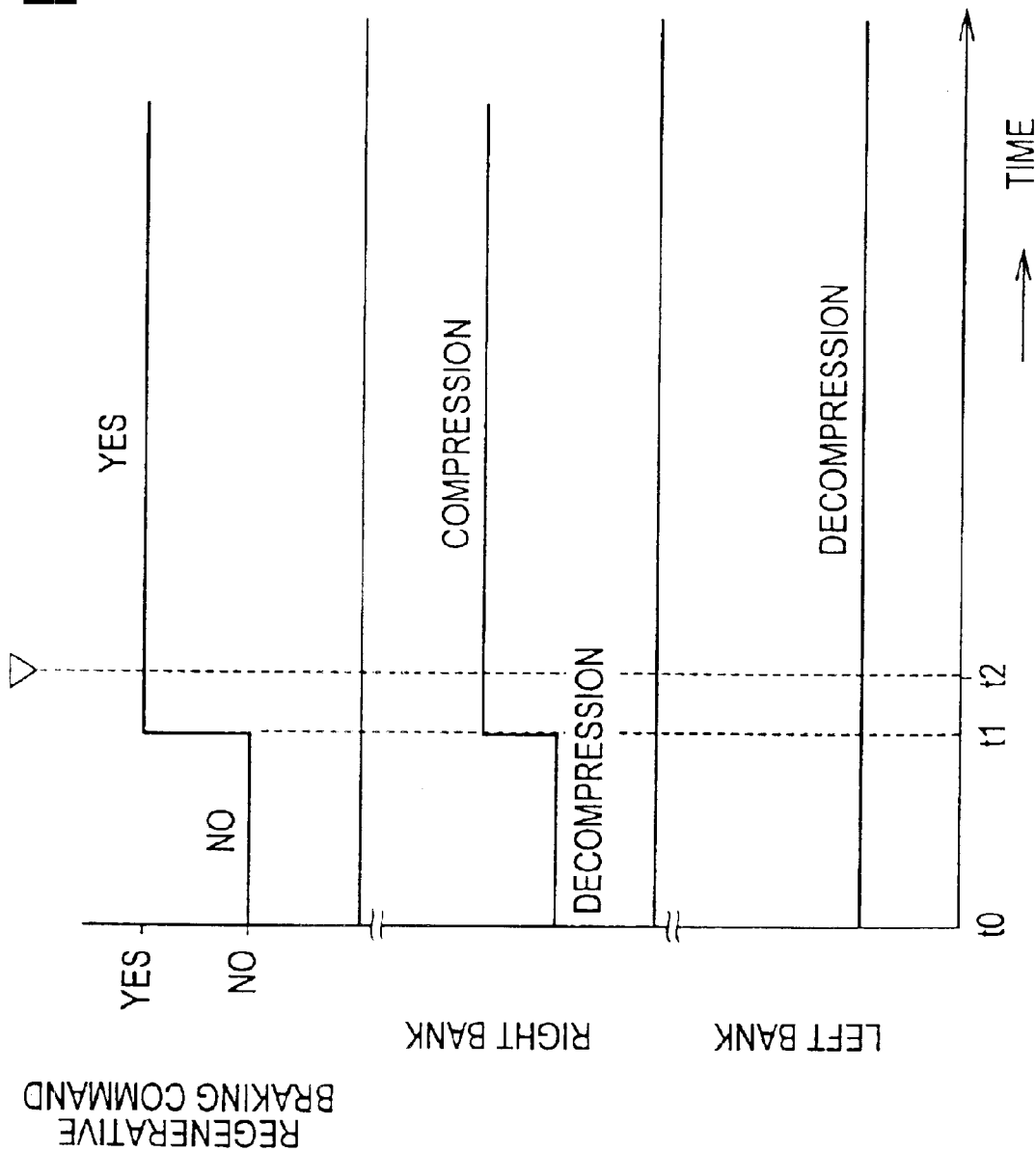
FIG. 18 is a time chart for explaining the control operation of the electronic control device of FIG. 16.

Referring to the flow chart of FIG. 17 illustrating a part of a control operation of the electronic control device 80, this control operation is repeatedly performed with a predetermined cycle time. The control operation is initiated with SB1 corresponding to the electricity-generating-mode determining means 110, to determine whether it is required to establish the electricity generating mode in which the MG1 or MG2 is operated as an electric generator to generate an electric energy, for instance, by determining whether the amount of electric energy left in the secondary battery 72 is smaller than the predetermined value. If a negative decision is obtained in SB1, one cycle of execution of the present control routine is terminated. If an affirmative decision is obtained in SB1, the control flow goes to SB2 corresponding to the neutral-state detecting means 114, to determine whether the power-transmitting path between the variable-cylinder engine 10 and the drive wheels is in the cut-off state, that is, whether the automatic transmission 16 is placed in its neutral state. If a negative decision is obtained in SB2, the control flow goes to SB3 corresponding to the neutral-control detecting means 116, to determine whether the vehicle is placed in the neutral control mode in which the clutch 12 is in the released state. If the negative decision is obtained in both of SB2 and SB3, the control flow goes to SB4 in which the MG1 or MG2 is operated to generate an electric energy, by the variable-cylinder engine 10 placed in the two-bank operating state. If an affirmative decision is obtained in at least one of SB2 and SB3, the control flow goes to SB5 in which the MG1 or MG2 is operated to generate an electric energy, by the variable-cylinder engine 10 placed in the single-bank operating state. SB5 is followed by SB6 in which the non-operating cylinders of the other bank of the variable-cylinder engine 10 are placed in the decompression state, to reduce a loss caused by the non-operating bank. In the example of FIG. 18, this state is established for a time period between points of time t1 and t2. In the present embodiment, the SB4 through SB6 correspond to the cylinder-number switching means 112.

In the present embodiment which has been described, the cylinder-number switching means 112 (SB5) places the variable-cylinder engine 10 in the partial-cylinder operating state, when the electricity-generating-mode determining means 110 (SB1) determines that the MG1 or MG2 is required to be operated to generate an electric energy. Thus, the engine is operated in the partial-cylinder operating state when it is necessary to generate an electric energy. Accordingly, the fuel economy during the operation of the electric generator is improved, since the electric generator is operated by the variable-cylinder engine 10 operated with a reduced loss of rotary motion.

In the present embodiment, the variable-cylinder engine 10 has a pair of banks 10A and 10B each of which has a plurality of cylinders and which are operable independently of each other. The cylinder-number switching means is arranged to plate one (10A) of the banks of the variable-cylinder engine 10 in the operating state and place the other bank in the decompression state, when the electricity-generation-mode determining means 110 determines that the MG1 or MG2 is required to be operated to generate an electric energy. Accordingly, the loss of rotary motion of the variable-cylinder engine 10 is further reduced to accordingly improve the fuel economy during the generation of an electric energy.

In the present embodiment, the cylinder-number switching means 112 is arranged to change the number of the operating cylinders of the variable-cylinder engine 10 which are used to operate the MG1 or MG2, depending upon whether the presently selected operating position of the shift lever is one of the drive positions such as the positions D and R, or one of the non-drive positions such as the positions N and P. Namely, the variable-cylinder engine 10 is placed in the full-cylinder operating state when the output torque oscillation of the variable-cylinder engine 10 is transmitted to the vehicle wheels through the power-transmitting path, with the shift lever placed in any drive position. The variable-cylinder engine is placed in the partial-cylinder or single-bank operating state when the output torque oscillation of the variable-cylinder engine 10 is not transmitted to the vehicle wheels, that is, when the power-transmitting path is cut off with the shift lever placed in any non-drive positions. This arrangement is effective to reduce the vehicle vibration while the MG1 or MG2 is operated by the variable-cylinder engine 10.

In the present embodiment, the cylinder-number switching means 112 is further arranged such that the number of the operating cylinders of the variable-cylinder engine 10 during running of the vehicle is in principle changed depending upon the number of the operating cylinders determined according to the stored drive-power-source data maps of FIGS. 7–9, so that the MG1 or MG2 is operated by the variable-cylinder engine 10 the number of the operating cylinders of which is determined according to the drive-power-source data maps. Accordingly, the fuel economy while the vehicle is running is also improved.

Figure 19:
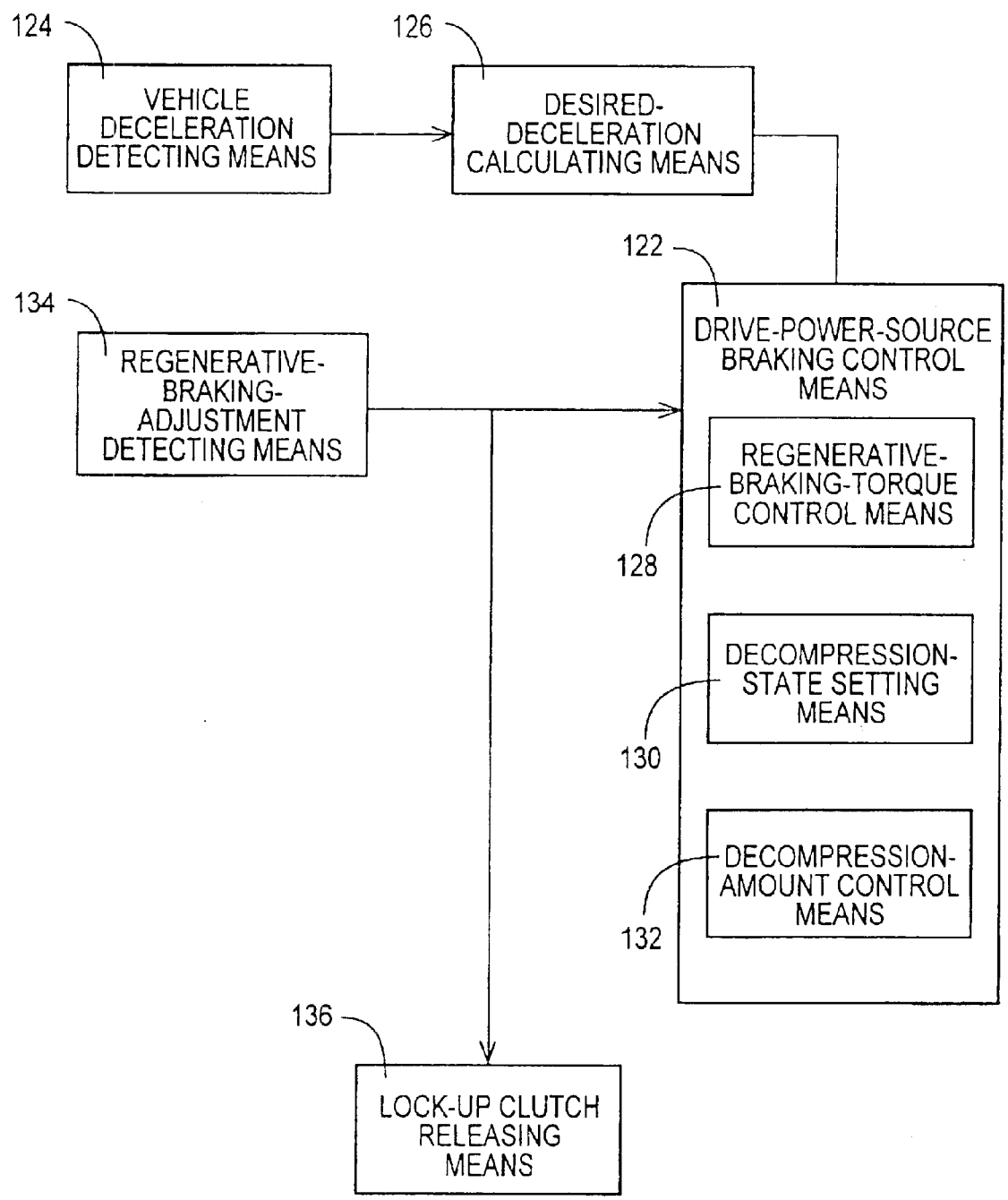
FIG. 19 is a block diagram illustrating some of functional means of an electronic control device in a further embodiment of this invention.

FIG. 19 is a block diagram illustrating other functional means of the electronic control device 80. Drive-power-source braking control means 122 indicated in FIG. 19 is arranged to control a drive-power-source braking torque during deceleration of the vehicle, on the basis of a regenerative braking torque produced during an operation of the MG1 or MG2 to generate an electric energy during the vehicle deceleration, and the decompression state of the non-operating cylinders of the variable-cylinder engine 10. The drive-power-source braking torque produced by operations of the variable-cylinder engine 10 and the MG1 or MG2 by a kinetic energy of the vehicle under deceleration, so as to brake the vehicle.

Vehicle-deceleration detecting means 124 is arranged to determine whether the vehicle is in a decelerating state. For example, this determination may be effected on the basis of the operating amount of the accelerator pedal and the running speed of the vehicle. Desired-deceleration calculating means 126 is arranged to calculate a desired deceleration value $G_T$ of the vehicle under deceleration, when the vehicle-deceleration detecting means 124 determines that the vehicle is in a decelerating state. The desired-deceleration calculating means 126 calculates the desired deceleration value $G_T$ on the basis of the actual vehicle running speed and a preset deceleration value manually set by the vehicle operator, and according to a stored predetermined relationship among those parameters. The above-indicated drive-power-source braking control means 122 controls the drive-power-source braking torque, on the basis of the regenerative braking torque produced by the MG1 or MG2 and the decompression state of the non-operating cylinders of the variable-cylinder engine 10 such that the actual deceleration value G of the vehicle coincides with the calculated desired deceleration value $G_T$.

The drive-power-source braking control means 122 includes: regenerative-braking-torque control means 128 for controlling an amount of regenerative braking torque produced by the MG1 or MG2; decompression-state setting means 130 for placing selected ones of the cylinders of the variable-cylinder engine 10 in the decompression state; and decompression-amount control means 132 for controlling an amount of decompression in the cylinders of the variable-cylinder engine 10 which are placed in the decompression state, namely, a resistance of those cylinder to an rotary motion of the engine, by controlling a resistance to a flow of intake air into the cylinders, by controlling an angle of opening of the throttle valve, for example. The drive-power-source braking control means 122 controls the amount of decompressing in the cylinders placed in the decompression state, such that the resistance to the rotary motion of the variable-cylinder engine 10 is increased when the amount of the regenerative braking torque produced by the MG1 or MG2 is reduced and made insufficient, so that the resistance is increased to compensate for a shortage of the regenerative braking torque.

Regenerative-braking-adjustment detecting means 134 is arranged to determine whether it is necessary to adjust the regenerative braking operation of the MG1 or MG2, for some reason or other, for instance, because it becomes impossible to continue the regenerative braking operation due to full charging or temperature rise of the secondary battery 72. Lock-up clutch releasing means 136 is arranged to place the lock-up clutch 26 in the released or partially slipping state, when the regenerative-braking-adjustment detecting means 134 determines that the adjustment of the regenerative braking operation is necessary. The lock-up clutch 26 is disposed between the variable-cylinder engine 10 and the automatic transmission 16. The lock-up clutch 26 is returned to its engaged state, after termination of the adjustment of the regenerative braking operation of the MG1 or MG2, an adjustment of the decompression amount of one of the banks according to the adjustment of the regenerative braking operation, and an adjustment of the compression amount of the other bank.

Figure 20:
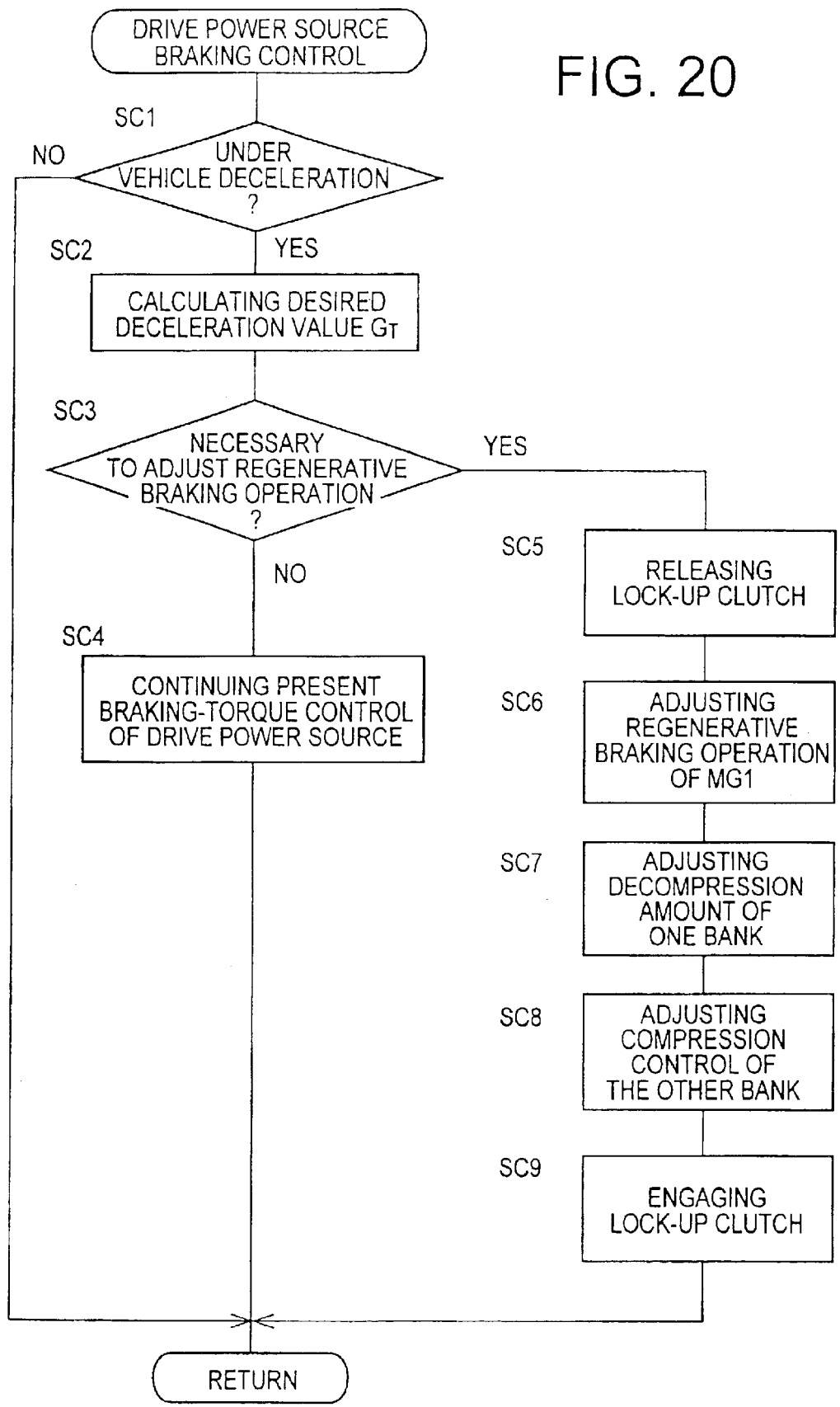
FIG. 20 is a flow chart illustrating a part of a control operation of the electronic control device of FIG. 19.

Referring to the flow chart of FIG. 20 illustrating a part of a control operation of the electronic control device 80, this control operation is repeatedly performed with a predetermined cycle time. The control operation is initiated with SC1 corresponding to the vehicle-deceleration calculating means, to determine whether the vehicle is in a decelerating state. For instance, this determination is effected by determining whether the vehicle running speed V is not lower than a predetermined value while the operating amount of the accelerator pedal is substantially zero. If a negative decision is obtained in SC1, one cycle of execution of the present control routine is terminated. If an affirmative decision is obtained in SC1, the control flow goes to SC2 corresponding to the desired-deceleration calculating means 126, to calculate the desired deceleration value $G_T$ of the vehicle under deceleration, on the basis of the actual vehicle running speed and the preset deceleration value set by the vehicle operator, and according to the stored predetermined relationship among those parameters. Then, SC3 corresponding to the regenerative-braking-adjustment detecting means 134 is implemented to determine whether it is necessary to adjust the regenerative braking operation of the MG1 or MG2, for some reason or other, for instance, because it becomes impossible to continue the regenerative braking operation due to full charging or temperature rise of the secondary battery 72. If a negative decision is obtained in SC3, the control flow goes to SC4 to continue the present braking-torque control of the drive power source in which the regenerative braking torque produced by the MG1 or MG2 is controlled such that the actual deceleration value G of the vehicle coincides with the desired deceleration value $G_T$.

If an affirmative decision is obtained in SC3, the control flow goes to SC5 through SC9 corresponding to the drive-power source braking control means 122. Initially, SC5 corresponding to the lock-up clutch releasing means 136 is implemented to place the lock-up clutch 26 in the released or partially slipping state. Then, SC6 corresponding to the regenerative-braking-torque control means 128 is implemented to adjust the amount of regenerative braking torque produced by the MG1 or MG2 such that the actual deceleration value G of the vehicle coincides with the desired deceleration value $G_T$. Subsequently, SC7 corresponding to the decompression-state setting means 130 is implemented to place selected ones of the cylinders of the variable-cylinder engine 10, for instance, one (10A) of the banks, in the decompression state, and then SC8 corresponding to the decompression-amount control means 132 is implemented to control the amount of decompression in the cylinders of the variable-cylinder engine 10 in the decompression state, namely, the resistance of those cylinder to an rotary motion of the engine, by adjusting the operating timings of the intake and exhaust valves or the opening angle of the throttle valve 62, so that the engine 10 produces a braking torque corresponding to the amount of shortage of the regenerative braking torque produced by the MG1 or MG2. Then, SC9 corresponding to the lock-up clutch releasing means 136 is implemented to return the lock-up clutch 26 to its engaged state. The other cylinders or other bank of the variable-cylinder engine 10 are placed in the compression state with the corresponding throttle valves 62 being held closed, so that the engine 10 can be restarted in a short time when needed.

Figure 21:
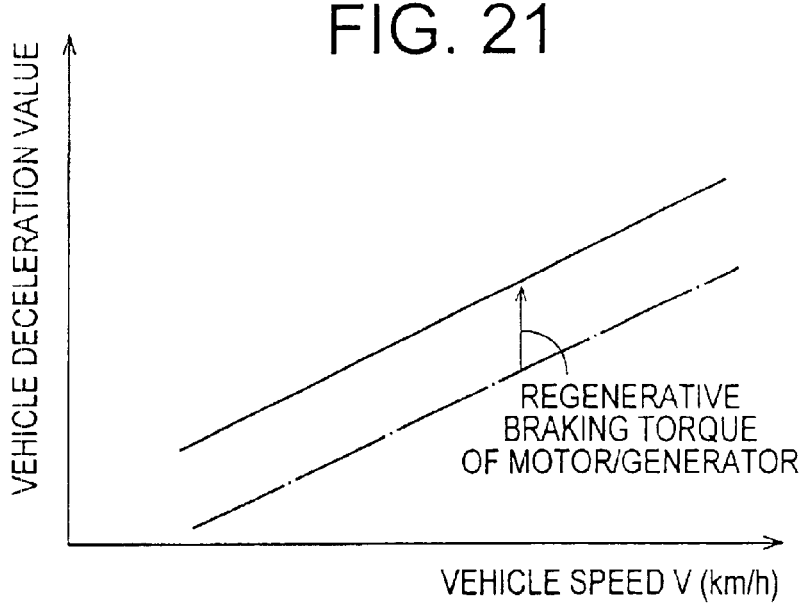
FIG. 21 is a view for explaining a relationship between an amount of regenerative braking by MG (motor/generator) and a vehicle deceleration value in the embodiment of FIG. 19.

In the present embodiment, the braking torque produced by the drive power source during deceleration of the vehicle is controlled by the drive-power-source braking control means 122, on the basis of the regenerative braking torque produced by the MG1 or MG2, and the amount of decompression of the non-operating cylinders of the variable-cylinder engine 10. Thus, the drive-power-source braking torque is adjusted according to the decompression amount of the variable-cylinder engine 10, as well as the regenerative braking torque. Namely, the number of parameters used to control the deceleration value of the vehicle is increase, so that the deceleration value can be controlled with an increased degree of adequacy. For instance, the deceleration value of the vehicle is adjusted depending upon the regenerative braking torque produced by the MG1 or MG2, as indicated in FIG. 21. When it becomes impossible to continue the regenerative braking operation of the MG1 or MG2 due to full charging or temperature rise of the secondary battery 72, the regenerative braking torque which has been produced by the MG1 or MG2 is replaced by the resistance of the variable-cylinder engine 10 to its rotary motion (braking torque produced by the engine 10).

In the present embodiment, there are provided the vehicle-deceleration detecting means 124 for determining whether the vehicle is in a decelerating state, and the desired-deceleration calculating means 126 operable when the vehicle-deceleration detecting means 124 determines that the vehicle is in the decelerating state, to calculate the desired deceleration value $G_T$ of the vehicle under deceleration, on the basis of the actual running speed V of the vehicle and the preset deceleration value preset by the operator of the vehicle, and according to a stored predetermined relationship among those parameters. The above-indicated drive-power-source braking control means 122 controls the drive-power-source braking torque, on the basis of the regenerative braking torque produced by the MG1 or MG2 and the decompression state of the non-operating cylinders of the variable-cylinder engine 10, such that the actual deceleration value G of the vehicle coincides with the calculated desired-deceleration value $G_T$. Accordingly, the vehicle can be decelerated at a value as desired by the vehicle operator.

In the present embodiment, the drive-power-source control means 122 includes the regenerative-braking-torque control means 128 for controlling the amount of regenerative braking torque produced by the MG1 or MG2, the decompression-state setting means 130 for placing the selected ones of the cylinders of the variable-cylinder engine 10 in the decompression state, and the decompression-amount control means 132 for controlling a resistance of those cylinder to an rotary motion of the engine, by controlling the operating timing of the intake and exhaust valves or the angle of opening of the throttle valve, for example. In this arrangement, the resistance to the rotary motion of the variable-cylinder engine 10 is increased when the amount of the regenerative braking torque produced by the MG1 or MG2 is reduced, so that the resistance is increased to compensate for a shortage of the regenerative braking torque.

In the present embodiment, there are provided the regenerative-braking-adjustment detecting means 134 for determining whether it is necessary to adjust the regenerative braking operation of the MG1 or MG2, and the lock-up clutch releasing means 136 for placing the lock-up clutch 26 disposed between the variable-cylinder engine 10 and the torque converter 14, in its released state or partially slipping state, when the regenerative-braking-adjustment detecting means 134 determines that it is necessary to adjust the regenerative braking operation of the MG1 or MG2. According to this arrangement, a shock that may be caused by the adjustment of the regenerative braking operation of the MG1 or MG2 can be absorbed by the torque converter 14.

Figure 22:
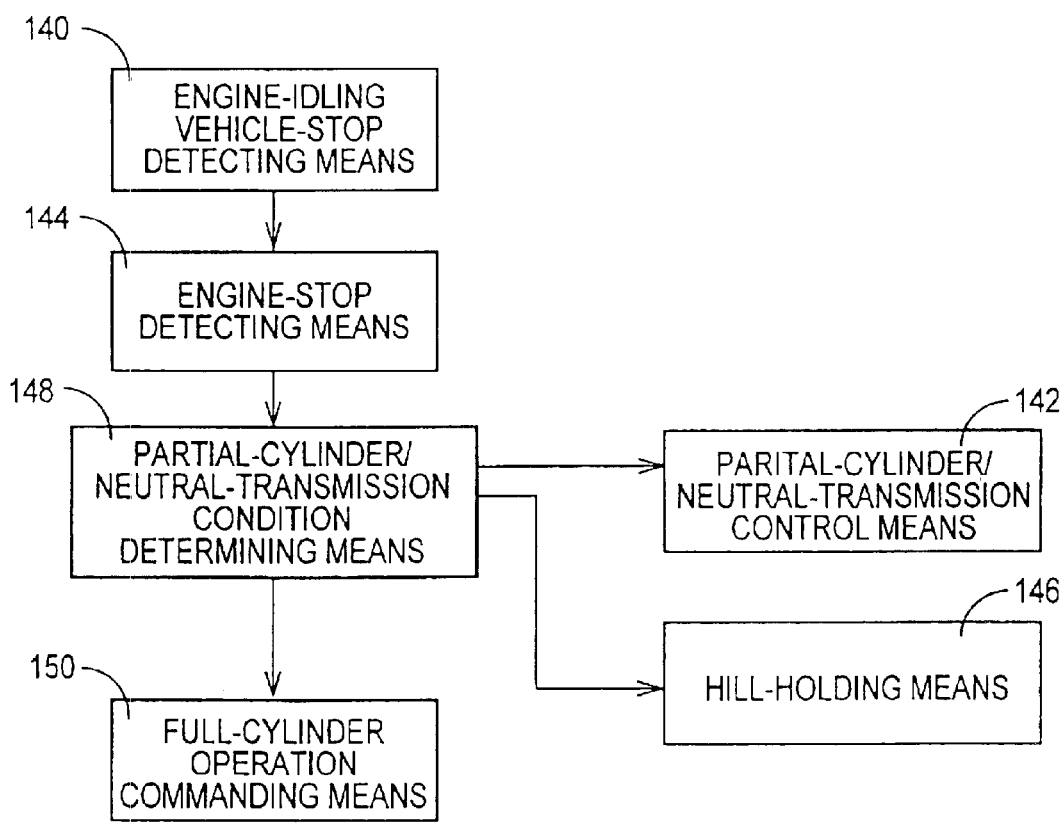
FIG. 22 is a block diagram illustrating some of functional means of an electronic control device in another embodiment of the invention.

FIG. 22 is a block diagram illustrating other functional means of the electronic control device 80. Engine-idling vehicle-stop detecting means 140 indicated in FIG. 16 is arranged to determine whether the vehicle is held stationary with the variable-cylinder engine 10 being held in an idling state. Partial-cylinder/neutral-transmission control means 142 is operable when the engine-idling vehicle-stop detecting means 140 determines that the vehicle is held stationary with the variable-cylinder engine 10 being held in the idling state. The partial-cylinder/neutral-transmission control means is arranged to place the variable-cylinder engine in the partial-cylinder operating state, and at the same time place the automatic transmission 16 in a neutral state.

Engine-stop detecting means 144 is arranged to determine whether the variable-cylinder engine 10 is at rest or not. Hill-holding means 146 is operable when the engine-idling vehicle-stop detecting means 140 determines that the vehicle is held stationary with the variable-cylinder engine 10 being held in the idling state, and while the engine-stop detecting means 144 does not determine that the variable-cylinder engine 10 is at rest. The hill-holding means 146 is arranged to activate a braking device for braking the vehicle to hold the vehicle stationary.

Partial-cylinder/neutral-transmission condition determining means 148 is arranged to determine whether it is concurrently possible to place the variable-cylinder engine 10 in the partial-cylinder operating state, place the automatic transmission 16 in the neutral state and operate the hill-holding means 146 for activating the braking device to hold the vehicle stationary. When this partial-cylinder/neutral-transmission condition determining means 148 determines that it is concurrently possible to place the variable-cylinder engine 10 in the partial-cylinder operating state, place the automatic transmission 16 in the neutral state and operate the hill-holding means 146 for activating the braking device to hold the vehicle stationary, the partial-cylinder/neutral-transmission control means 142 places the variable-cylinder engine 10 in the partial-cylinder operating state and at the same time places the automatic transmission 16 in the neutral state, and the hill-holding means 146 activates the braking device to hold the vehicle stationary. When the partial-cylinder/neutral-transmission condition determining means 148 does not determine that it is concurrently possible to place the variable-cylinder engine 10 in the partial-cylinder operating state, place the automatic transmission 16 in the neutral state and operate the hill-holding means 146 for activating the braking device to hold the vehicle stationary, full-cylinder operation commanding means 150 places the variable-cylinder engine 10 in the full-cylinder operating state, and the hill-holding means 146 deactivates the braking device to release brake application to the vehicle.

Figure 23:
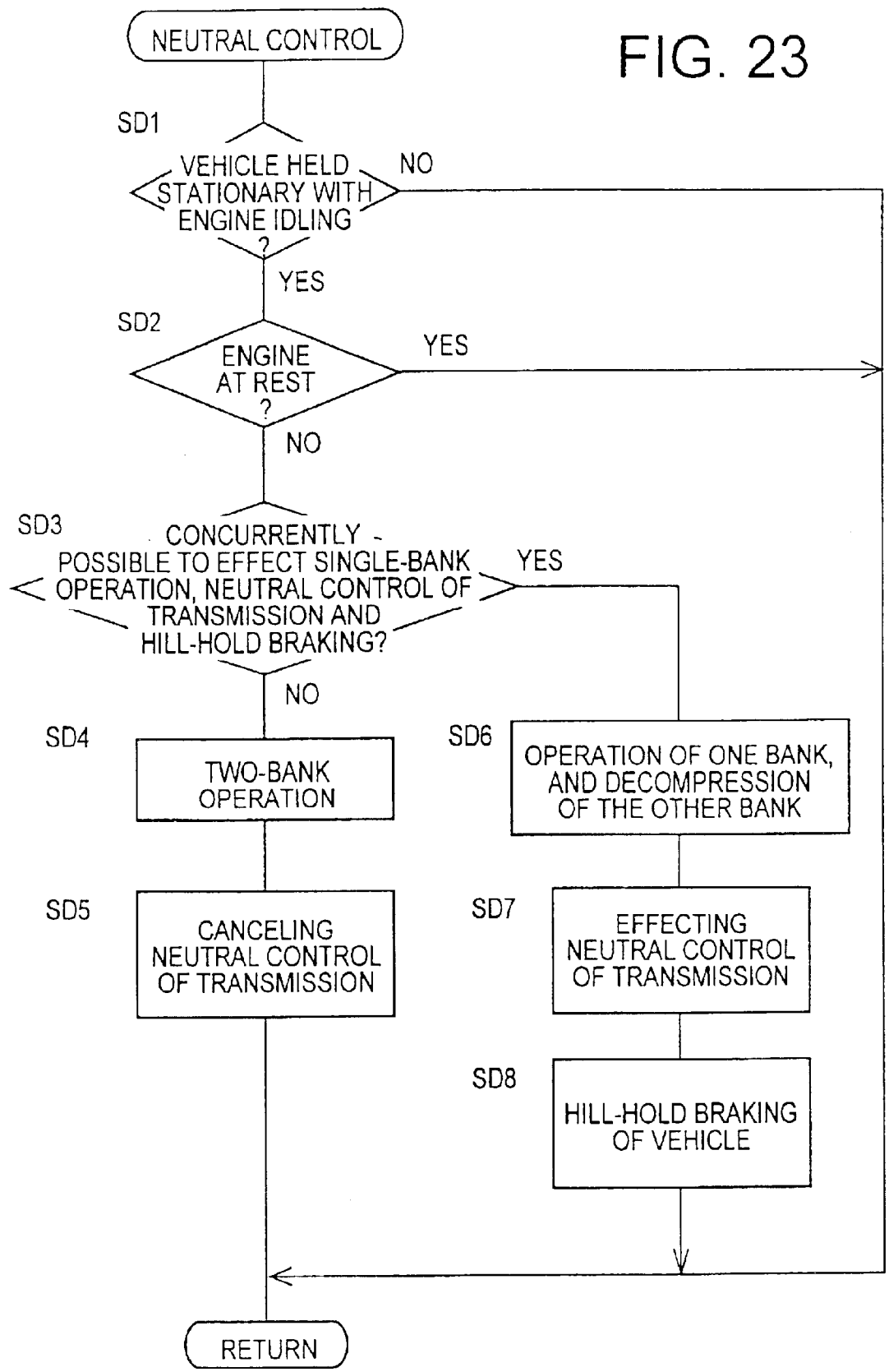
FIG. 23 is a flow chart illustrating a part of a control operation of the electronic control device of FIG. 22.

Referring to the flow chart of FIG. 23 illustrating a part of a control operation of the electronic control device 80, this control operation is repeatedly performed with a predetermined cycle time. The control operation is initiated with SD1 corresponding to the engine-idling vehicle-stop detecting means 140, to determine whether the vehicle is held stationary with the running speed V being zero, and with the variable-cylinder engine 10 held in the idling state. If a negative decision is obtained in SD1, one cycle of execution of this control routine is terminated. If an affirmative decision is obtained in SD1, the control flow goes to SD2 corresponding to the engine-stop detecting means 144, to determine whether the variable-cylinder engine 10 is at rest. If an affirmative decision is obtained in SD2, one cycle of execution of the present control routine is terminated. If a negative decision is obtained in SD2, the control flow goes to SD3 corresponding to the partial-cylinder/neutral-transmission condition determining means 148, to determine whether it is concurrently possible to place the variable-cylinder engine 10 in the partial-cylinder operating state, place the automatic transmission 16 in the neutral state and operate the hill-holding means 146 for activating the braking device to hold the vehicle stationary. If a negative decision is obtained in SD3, the control flow goes to SD4 corresponding to the full-cylinder operation commanding means 150 to place the variable-cylinder engine 10 in the full-cylinder operating state, and to SD5 to release the neutral state of the automatic transmission.

Figure 24:
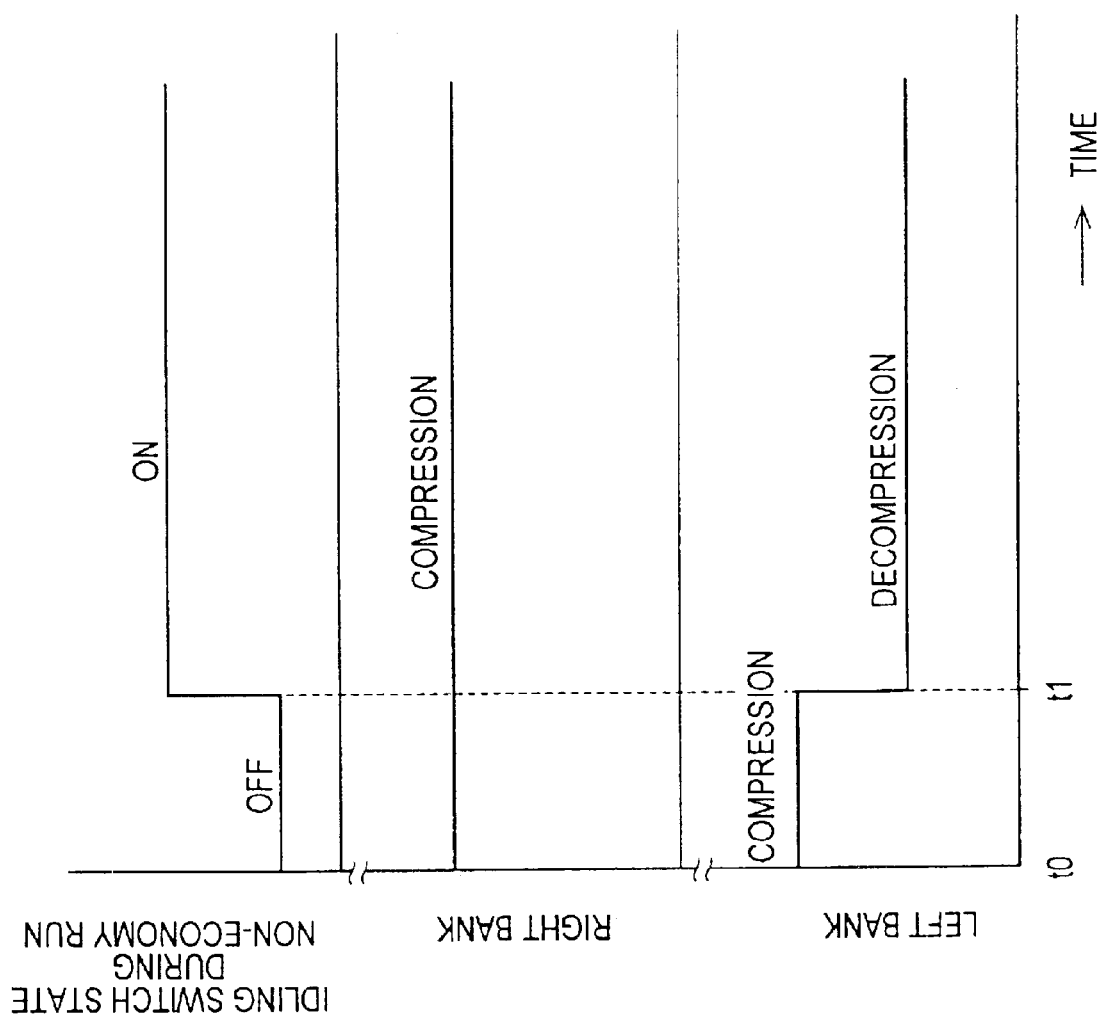
FIG. 24 is a time chart for explaining the control operation in the embodiment of FIG. 22.

If an affirmative decision is obtained in SD3 indicated above, he control flow goes to SD6 and SD7 corresponding to the partial-cylinder/neutral-transmission control means 142, to place one of the banks (for example, the bank 10A) of the variable-cylinder engine 10 in the operating state and place the other bank (for example, the bank 10B) in the decompression state, and to place the automatic transmission 16 in the neutral state, by releasing all of the frictional coupling devices except the clutch C0. Then, SD8 corresponding to the hill-holding means 146 is implemented to activate the braking device for holding the vehicle stationary. In the example of FIG. 24, this state is established for a time period after a point of time $t_1$.

In the present embodiment described above, there are provided the engine-idling vehicle-stop detecting means 140 for determining whether the vehicle is held stationary with the variable-cylinder engine 10 being held in an idling state, and the partial-cylinder/neutral-transmission control means 142 operable when the engine-idling vehicle-stop detecting means 140 determines that the vehicle is held stationary with the variable-cylinder engine 10 held in an idling state. The partial-cylinder/neutral-transmission control means is arranged to place the variable-cylinder engine 10 in the partial-cylinder operating state or in the single-bank operating state, and at the same time place the automatic transmission 16 in the neutral state. The fuel economy of the vehicle is improved in this arrangement in which the variable-cylinder engine 10 is operated in the partial-cylinder operating state while at the same time the automatic transmission 16 is placed in the neutral state while the vehicle is held stationary with the engine 10 held in an idling state. Further, the vibration of the variable-cylinder engine 10 is not transmitted to the vehicle drive wheels, and the operating noises of meshing gears under no-load condition are reduced. Thus, the present arrangement reduces the vibration and noises.

Further, the present embodiment is provided with the engine-stop detecting means 144 for determining whether the vehicle is held stationary, and the hill-holding means 146 operable when the engine-stop detecting means 144 does not determine that the vehicle is held stationary, for activating the braking device to hold the vehicle stationary. Accordingly, the vehicle can be held stationary even on a slope, while the automatic transmission 16 is placed in its neutral state with the variable-cylinder engine 10 placed in the partial-cylinder operating state.

The present embodiment is further provided with the partial-cylinder/neutral-transmission condition determining means 148 for determining whether it is concurrently possible to place the variable-cylinder engine 10 in the partial-cylinder operating state, place the automatic transmission 16 in the neutral state and operate the hill-holding means 146 to hold the vehicle stationary. If the partial-cylinder/neutral-transmission condition determining means 148 determines that it is not concurrently possible to place the variable-cylinder engine 10 in the partial-cylinder operating state, place the automatic transmission 16 in the neutral state and operate the hill-holding means 146 to hold the vehicle stationary, the variable-cylinder engine 10 is placed in the full-cylinder operating state or the two-bank operating state. Accordingly, the idling of the variable-cylinder engine 10 is defected in the full-cylinder operating state, while the variable-cylinder engine 10 is in a warm-up operation (while the engine 10 is still cold), while the engine 10 is not operable in the partial-cylinder operating state due to some defect, wile the automatic transmission 16 is still cold, or is not normally placed in its neutral state due to some defect.

Figure 25:
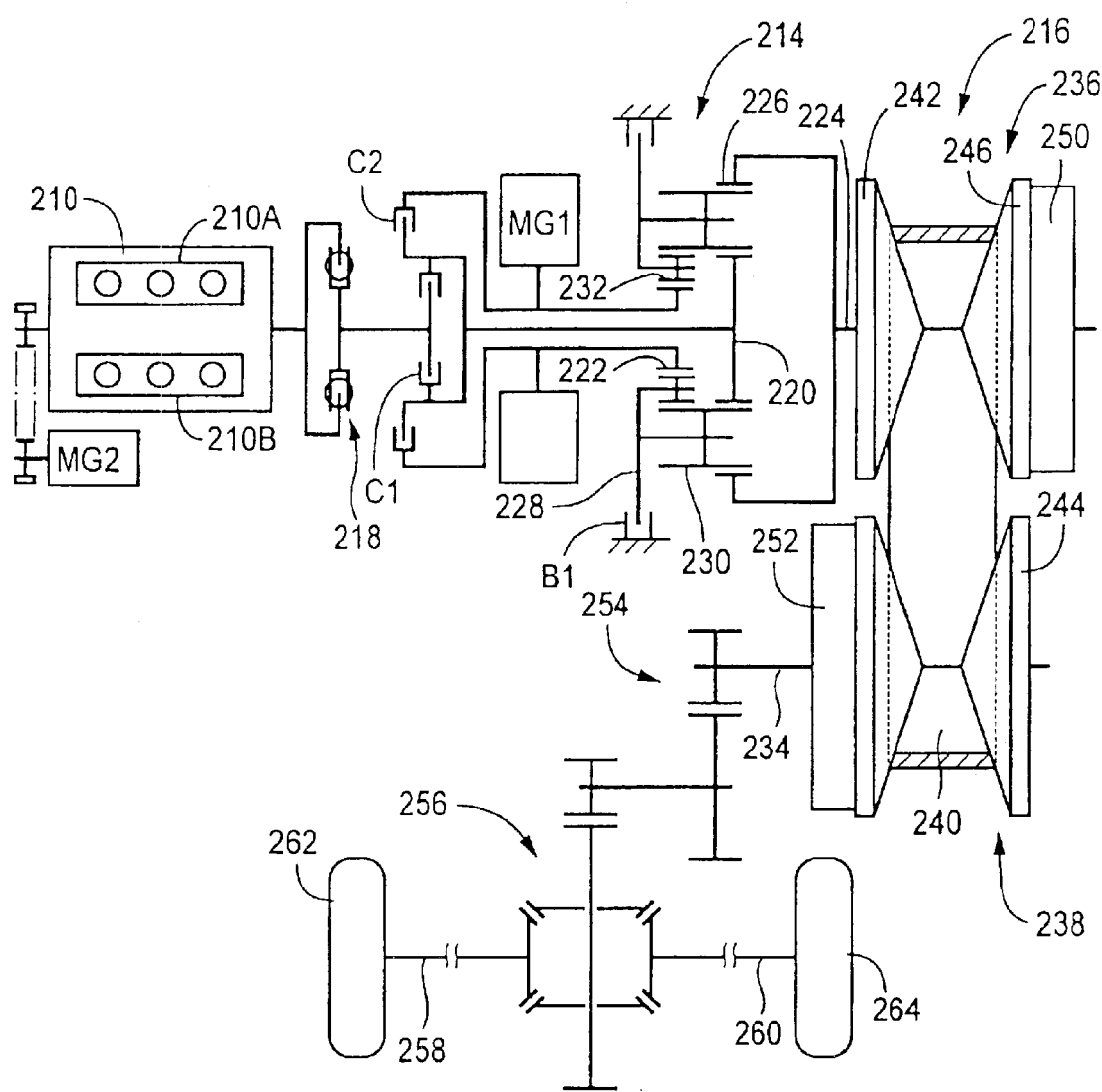
FIG. 25 is a schematic view showing a part of a drive system of an automotive vehicle to which a vehicle control apparatus according to another embodiment of this invention is applicable.

FIG. 25 is a schematic view for explaining an arrangement of a power transmitting system of a vehicle according to a further embodiment of this invention. This power transmitting system includes a variable-cylinder engine 210, a motor/generator MG1 (hereinafter referred to as "MG1") selectively functioning as an electric motor or an electric generator, a planetary gear device 214 having a gear train, and a continuously variable transmission 216 whose speed ratio is continuously variable. The variable-cylinder engine 210, MG1, planetary gear device 214 and continuously variable transmission 216 are disposed coaxially with each other. The variable-cylinder engine 210 has a pair of banks 210A and 210B which are selectively made operable and inoperable and have the same number of cylinders that is equal to a half of the total number of cylinders of the engine. The variable-cylinder engine 210 functions as a first driving motor, namely, a primary driving motor, and the MG1 functions as a second driving motor, namely, an auxiliary driving motor. The variable-cylinder engine 210 is operatively connected to a motor/generator (hereinafter referred to as "MG2"), which is used to start the engine 210 and which selectively functions as an electric motor or an electric generator.

The planetary gear device 214 is a synthesizing and distributing mechanism which is arranged to mechanically synthesize forces and distribute a force. The planetary gear device 214 includes three rotary elements disposed rotatably about a common axis independently of each other, that is, a large-diameter sun-gear 220, a small-diameter sun gear 222 and a ring gear 226. The large-diameter sun-gear 220 is connected the above-indicated engine 10 through a damper device 218 and a first clutch C1. The small-diameter sun gear 222 is connected to the above-indicated engine 10 through the damper device 218 and a second clutch C2, and an output shaft of the above-indicated MG1 is connected to the small-diameter sun gear 222. The ring gear 226 is connected to an input shaft 224 of the continuously variable transmission 216. The planetary gear device 214 further includes: a carrier 228 whose rotation is inhibited by a brake B1; large-diameter pinions (planetary gears) 230 which are disposed between the ring gear 226 and the large-diameter sun gear 220 and mesh with these ring gear 226 and sun gear 220, and which are rotatably supported by the carrier 228; and small-diameter pinions (planetary gears) 232 which are disposed between the large-diameter pinions 230 and the small-diameter sun gear 222 and mesh with these pinions 230 and sun gear 222, and which are rotatably supported by the carrier 228. The first and second clutches C1, C2 and brake B1 indicated above are hydraulically operated frictional coupling devices each of which includes a plurality of mutually superposed friction plates. Each of these clutches C1, C2 and brake B1 is engaged with the friction plates being forced against each other by a hydraulic actuator, and is released with the friction plates being moved apart from each other by the hydraulic actuator.

The planetary gear device 214 and the MG1 connected to the small-diameter sun gear 214 constitute an electric torque converter (ETC) adapted to gradually increase the amount of electric energy to be generated by the MG1 during an operation of the engine 210, that is, during rotation of the large-diameter sun gear 220, so as to gradually increase a drive torque of the MG1 or a reaction force of the small-diameter sun gear 222, for thereby smoothly increasing the rotating speed of the ring gear 226, so as to permit smooth starting acceleration of the vehicle. Where a gear ratio $\rho_1$ of the planetary gear device 214 (which is a ratio of the number of teeth of the small-diameter sun gear 222 to that of the ring gear 226) is 0.5 as in an ordinary planetary gear device, the torque of the engine 210 is boosted $1/\rho_1$ times, for instance, two times, according to a relationship in which the torque values of the ring gear 226, carrier 228 and large-diameter sun gear 220 are $1/\rho_1$, $(1-\rho_1)/\rho_1$ and 1, respectively. The thus boosted torque of the engine 210 is transmitted to the input shaft 224 of the continuously variable transmission 216. In this state, the electric torque converter is in a torque boosting mode or is considered to be placed in a first gear position ("$1^{st}$") having a gear ratio of $1/\rho_1$. When the clutches C1 and C2 are both engaged, the rotary elements of the planetary gear 214 are rotated as a unit. In this state, the electric torque converter is considered to be placed in a second gear position ("$2^{nd}$") having a gear ratio of 1.

The continuously variable transmission 216 described above includes a pair of variable-diameter pulleys 236, 238 mounted on the input shaft 224 and an output shaft 234, respectively, and an endless transmission belt 240 connecting the pair of variable-diameter pulleys 236, 238. This transmission belt 240 functions as a power transmitting member for transmitting power through a friction between the belt and the variable-diameter pulleys 236, 238 against which the belt is pressed. The pair of variable-diameter pulleys 236, 238 have respective stationary rotors 242, 244 fixed on the respective input and output shafts 224, 234, and respective movable rotors 246, 248 which are mounted on the respective input and output shafts 224, 234 axially movably and not rotatably relative to these shafts 224, 234 such that the movable rotors 246, 248 cooperate with the respective stationary rotors 242, 244 to define respective V-grooves therebetween. The variable-diameter pulleys 236, 238 further include respective hydraulic cylinders 250, 252 operable to axially move the movable rotors 246, 248 with thrust forces, for thereby changing the effective diameters of the variable-diameter pulleys, to change a speed ratio γ (rotating speed of the input shaft/rotating speed of the output shaft).

The output torque of the output shaft 234 of the above-indicated continuously variable transmission 216 is transmitted to a pair of front wheels (drive wheels) 262, 264 through a speed reducing device 254, a differential gear device 256 and a pair of axles 258, 260. In the present embodiment, the pair of front wheels 262, 264 serves as drive wheels. However, rear wheels may serve as drive wheels.

Figures 26, 27:
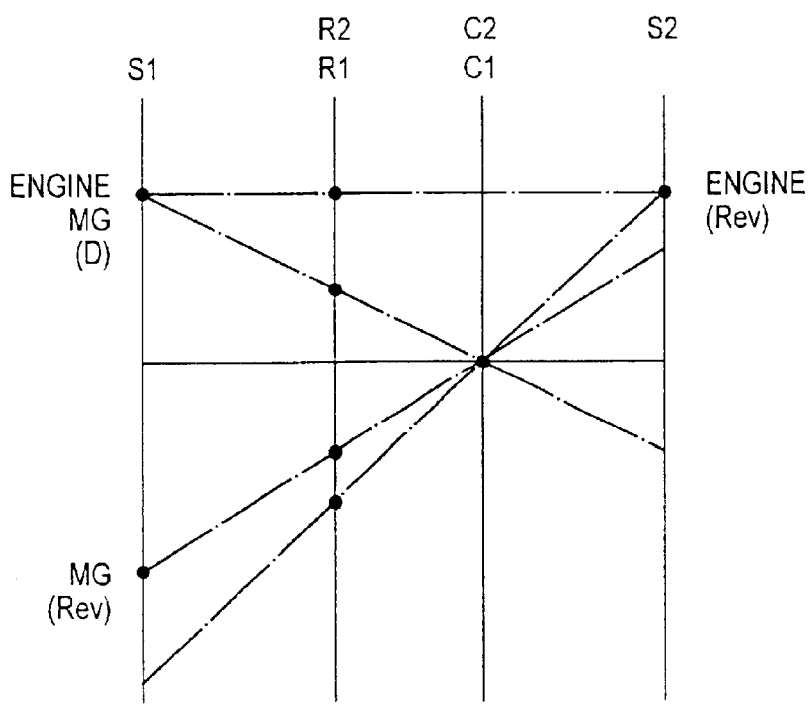
FIG. 26 is a table indicating a relationship between combinations of operating positions of a planetary gear device provided in a power transmitting device of FIG. 25, and respective combinations of operating states of frictional coupling devices in the planetary gear device.
FIG. 27 is a collinear diagram for explaining the operating of the planetary gear device provided in the power transmitting device of FIG. 25.

FIG. 26 indicates gear positions and vehicle running modes available for each of the selectively operated drive power sources or driving motors, in relation to respective combinations of the operating states of the hydraulically operated frictional coupling devices described above. FIG. 27 is a collinear diagram for explaining the operation of the planetary gear device 214. In this collinear diagram, the speeds of the rotary elements are represented by respective vertical axes, while the gear ratio is represented by a horizontal axis. In a reverse-drive position ("Rev"), the direction of rotation of the MG1 is reversed, and the reversed rotation is transmitted to the small-diameter sun gear 222. In principle, the MG1 assures a sufficient creep force during stopping of the vehicle in both of a forward-drive position and the reverse-drive position. Except when the MG1 is defective, the vehicle can be started by the MG1. If a fuel in a fuel cell (not shown) has been exhausted, or if an amount of electric energy SOC left in a secondary battery (not shown) is almost zeroed, the MG2 provided to start the engine 210 is operated to charge the secondary battery, thereby permitting the MG1 to start the vehicle. When the vehicle is started by the MG1, the planetary gear device 214 is placed in a low-speed position with the brake B1 placed in the engaged state. When the vehicle running by the MG1 is switched to a vehicle running by the variable-cylinder engine 210, the MG2 is operated to start the engine 210.

When the speed of the engine 210 has increased to a synchronous level, the clutch C1 is engaged so that the vehicle is driven, in a second-speed position, by the variable-cylinder engine 210. The vehicle can be started by the variable-cylinder engine 210, as well. In this case, the vehicle is slowly accelerated with the clutch C1 is placed in a slipping state as long as the vehicle speed is relatively low. When the vehicle speed has increased to a comparatively high value, the clutch C1 is brought to its fully engaged state. The same control arrangement is employed for driving the vehicle in the reverse direction. Namely, the MG1 operated in the reverse direction provides a sufficient creep force, and the variable-cylinder engine 210 is started when it becomes necessary to drive the vehicle in the reverse direction with a relatively large torque. The clutch C1 is placed in the slipping state while the reverse running speed is comparatively low. The planetary gear device 214 which has been described provides all functions necessary to start and drive the vehicle.

Figure 28:
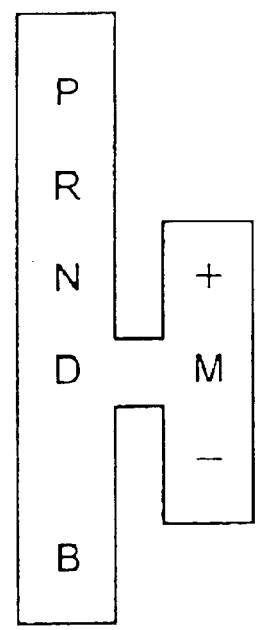
FIG. 28 is a view for explaining operating positions of a shift lever provided in the vehicle of FIG. 25.
Figure 29:
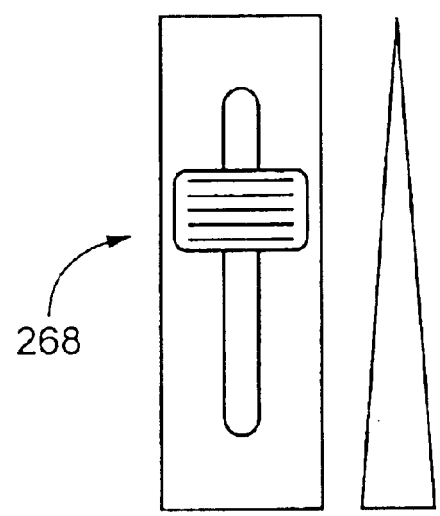
FIG. 29 is a view showing a deceleration setting switch operated by an operator in the vehicle of FIG. 25.

FIG. 28 shows operating positions of a shift lever provided in a-console box of the vehicle. The operating positions of the shift lever consist of a position P for parking the vehicle; a position R for driving the vehicle in the reverse direction; a position N for placing the power transmitting system in its neutral state; a position D for driving the vehicle in the forward direction with an automatic control of the speed ratio; a position B for applying an engine brake to the running vehicle; and a position M from which the shift lever is manually shifted in a jogging fashion to a position "+" or "−", to change the speed ratio during forward running of the vehicle. FIG. 29 shows a deceleration setting switch 268 of sliding type manually operated to control the deceleration value or decelerating torque of the vehicle under deceleration. According to a position of this deceleration setting switch 268, the speed ratio γ of the continuously variable transmission 216 is controlled to decelerate the vehicle at the desired deceleration value.

Figure 30:
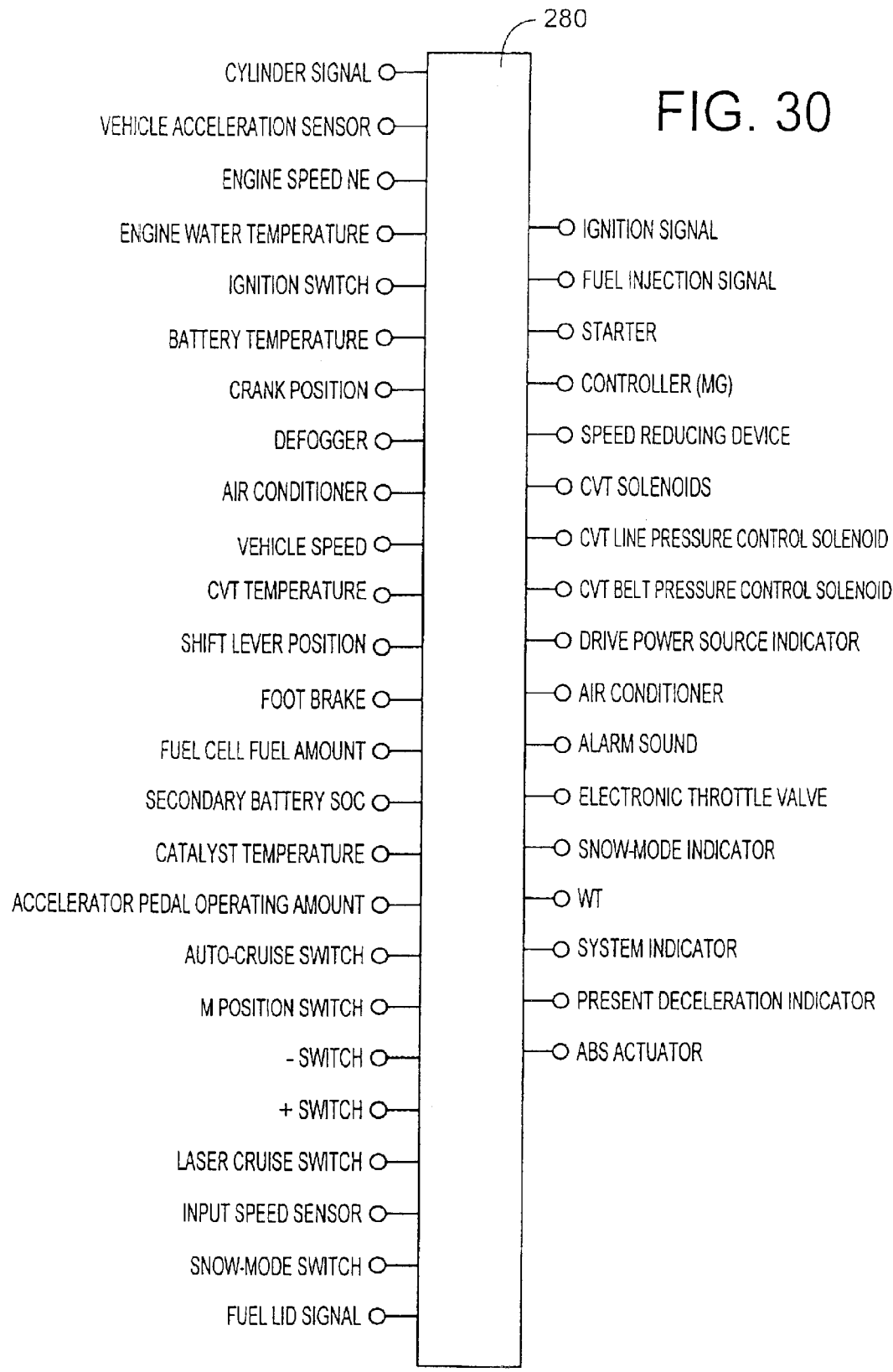
FIG. 30 is a view for explaining some of input and output signals of an electronic control device provided in the vehicle of FIG. 25.

FIG. 30 shows input signals to be received by an electronic control device 280 and output signals to be generated from the electronic control device 280. For example, the input signals to be received from various sensors (not shown) include an accelerator opening signal indicative of an operating angle $\theta_{ACC}$ of an accelerator pedal, a vehicle speed signal indicative of an operating speed $N_{OUT}$ of the output shaft 216 of the continuously variable transmission 216, a signal indicative of a operating speed $N_E$ of the engine, a signal indicative of a presently selected operating position of the shift lever, and a signal indicative of the temperature of the working fluid in the continuously variable transmission 216. The output signals to be generated from the electronic control device 80 include a fuel injection signal for controlling an amount of fuel to be injected from the fuel injector valve into each cylinder of the variable-cylinder engine 210, signals for controlling shift control valves incorporated in a hydraulic control unit, to control the speed ratio of the continuously variable transmission 216, and a signal for controlling a belt-force control valve incorporated in the hydraulic control unit, to control the pressing force of the transmission belt.

Figure 31A:
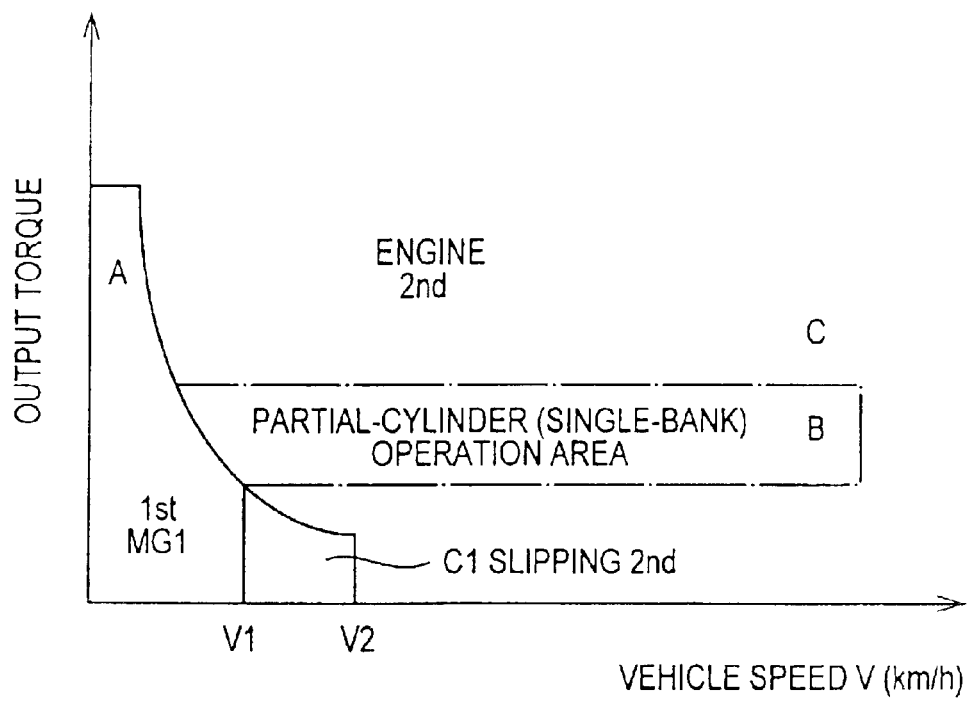
FIG. 31 is a view showing a drive-power-source data maps used to select a driving motor or a drive power source in the vehicle of FIG. 25, the data map shown at (a) being used when the shift lever is placed in a forward drive position, while the data map shown at (b) being used when the shift lever is placed in a rear drive position.
Figure 31B:
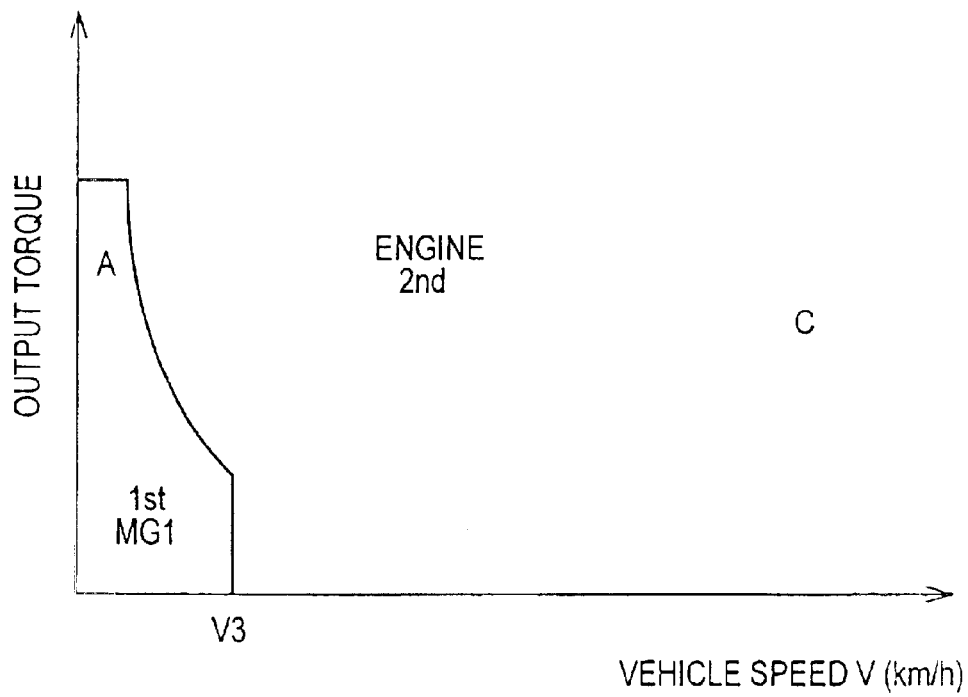

The electronic control device 280 includes a so-called microcomputer incorporating a CPU, a ROM, a RAM, and an input-output interface. The CPU operates to effect signal processing operations according to control programs stored in the ROM, while utilizing a temporary data storage function of the RAM, for executing various control routines such as a drive-power-source switching control routine, a shift control routine for controlling the continuously variable transmission 216, and a belt-force control routine. For instance, the drive-power-source switching control routine is formulated to select one of an electric-motor operating area A and an engine operating area (partial-cylinder operating area B or a full-cylinder operating area C), on the basis of the actual vehicle running speed V and output torque (operating amount $\theta_{ACC}$ of the accelerator pedal), and according to stored drive-power-source data maps of FIG. 31. In the electric-motor operating area A, the MG1 is selected as the driving motor to drive the vehicle primarily with the MG1. In the engine operating area, the variable-cylinder engine 210 is selected as the driving motor to drive the vehicle primarily with the variable-cylinder engine 210. The drive-power-source data map of FIG. 31(a) is used to select the drive power source when the shift lever is placed in the forward-drive position, while the drive-power-source data map of FIG. 31(b) is used to select the drive power source when the shift lever is placed in the reverse-drive position. Boundary vehicle speeds $V_3$, $V_2$ and $V_1$ indicated in FIG. 31, which define the electric-motor operating area A and the full-cylinder operating area C, have the following relationship: $V_3 < V_1 < V_2$.

The shift control routine indicated above is formulated to control the continuously variable transmission 216 selectively in an automatic shifting mode or a manual shifting mode. In the automatic shifting mode, a desired engine speed $N_{ET}$ is determined on the basis of the actual vehicle running speed V and operating amount $\theta_{ACC}$ of the accelerator pedal, and according to a stored predetermined relationship among those parameters, which relationship is determined for maximizing the fuel economy and optimizing the vehicle drivability. The speed ratio is controlled such that the actual engine speed $N_E$ coincides with the determined desired engine speed $N_{ET}$. In the manual shifting mode, the speed ratio γ is changed by moving the shift lever to the position "+" or "−", such that the amount of the working fluid in the input side hydraulic cylinder 250 is adjusted to change the speed ratio γ by a predetermined amount Δγ each time the shift lever is moved to the position "+" or "−". The belt-force control routine is formulated to calculate a basic belt-force control pressure $P_{BLTB}$ on the basis of the actual input torque $T_{IN}$ and speed ratio γ of the continuously variable transmission 216, and according to a stored predetermined relationship among those parameters, which relationship is determined for minimizing the pressing force of the transmission belt 240 while preventing slipping of the belt. A belt-force control pressure $P_{BLT}$ obtained by adding a compensation value $\Delta P_{BLT}$ to the calculated basic belt-force control pressure $P_{BLTB}$ is applied to the output side hydraulic cylinder 252.

Figure 32:
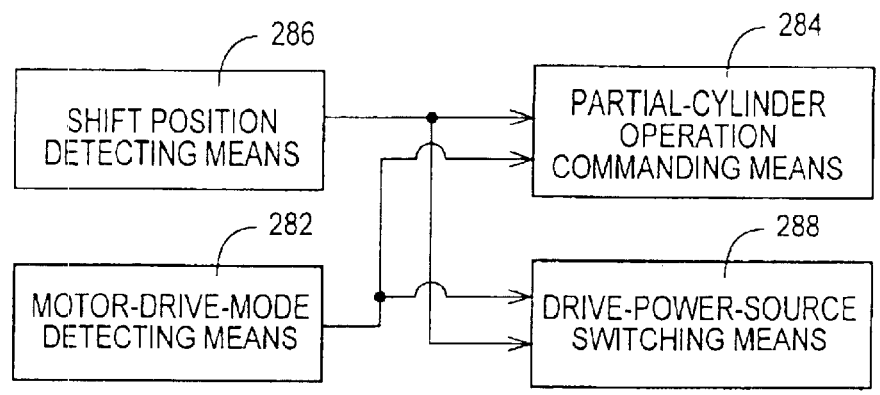
FIG. 32 is a block diagram illustrating some of function means of an electronic control device of FIG. 30.

FIG. 32 is a block diagram illustrating functional means of the electronic control device 280. Motor-drive-mode detecting means 282 shown in FIG. 32 is arranged to determine whether the vehicle is running in a motor-drive mode in which the MG1 is operated as the drive power source while the MG1 is disconnected from the variable-cylinder engine 210 with the clutch C1 placed in the released state, for instance. Partial-cylinder operation commanding means 284 is operable when the motor-drive-mode detecting means 282 determines that the vehicle is running in the motor-drive mode. The partial-cylinder operation commanding means 284 is arranged, for instance, to place the variable-cylinder engine 210 in the partial-cylinder or single-bank operating state, for operating the MG2 to generate an electric energy to be supplied to the MG1.

Shift-position detecting means 286 is arranged to determine whether the shift lever is placed in its neutral position.

When the shift-position detecting means 286 determines that the shift lever is placed in its neutral position, the partial-cylinder operation commanding means 284 is also operated to place the variable-cylinder engine 210 in the partial-cylinder or single-bank operating state, for operating the MG2 to generate an electric energy to be supplied to the MG1. Drive-power-source switching means 288 is operable when the motor-drive-mode detecting means 282 does not determine that the vehicle is running in the motor-drive mode with the MG1 operated as the drive power source, or when the shift-position detecting means 286 does not determine that the shift lever is placed in the neutral position. The drive-power-source switching means 288 is arranged to select the drive power source, and change the number of the operating cylinders of the engine, on the basis of the actual vehicle running speed V and output torque and according to the stored predetermined relationship of FIG. 31.

Figure 33:
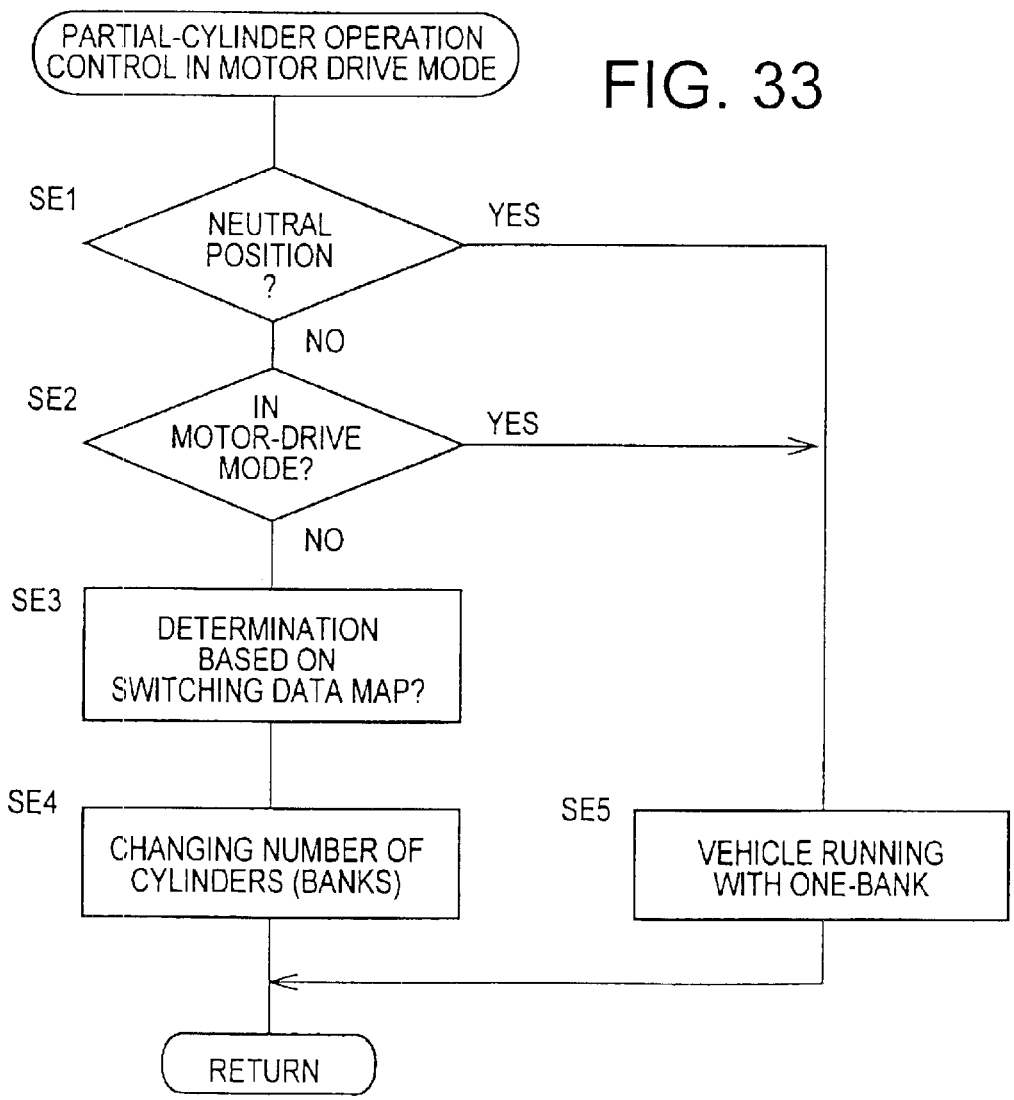
FIG. 33 is a flow chart illustrating a part of a control operation of the electronic control device of FIG. 30.

Referring to the flow chart of FIG. 33 illustrating a part of a control operation of the electronic control device 280, this control operation is repeatedly performed with a predetermined cycle time. The control operation is initiated with SE1 corresponding to the shift-position detecting means 286, to determine whether the shift lever is placed in the neutral position. If a negative decision is obtained in SE1, the control flow goes to SE2 corresponding the motor-drive-mode detecting means 282, to determine whether the vehicle is running in the motor-drive mode in which the MG1 is operated as the drive power source while the MG1 is disconnected from the variable-cylinder engine 210 with the clutch C1 placed in the released state. If a negative decision is obtained in SE2, the control flow goes to SE3 and SE4 corresponding to the drive-power-source switching means 288, to select the drive power source, and determine the number of the operating cylinders of the engine, on the basis of the actual vehicle running speed V and output torque and according to the stored predetermined relationship of FIG. 31, so that the selected drive power source is operated, and the engine if selected as the drive power source is operated with the determined number of the cylinders in the operating state. If an affirmative decision is obtained in SE1 or SE2, the control flow goes to SE5 corresponding to the partial-cylinder operation commanding means 288, to place the variable-cylinder engine 210 in the partial-cylinder or single-bank operating state, for operating the MG2 to generate an electric energy to be supplied to the MG1.

In the present embodiment, the partial-cylinder operation commanding means 284 (SE5) is operated, upon determination by the motor-drive-mode detecting means 282 (SE1) that the vehicle is running the motor-drive mode, to operate the variable-cylinder engine 210 in the partial-cylinder or single-bank operating state, for operating the MG2 to generate the electric energy to be supplied to the MG1, so that the fuel economy of the vehicle is improved.

The present embodiment is further arranged such that the drive force of the variable-cylinder engine 210 is transmitted to the drive wheels 262, 264 through the continuously variable transmission 216, so that the fuel economy of the vehicle is further improved.

The present embodiment is further arranged to place the input clutch C1 in the released state for disconnecting the power transmitting path between the variable-cylinder engine 210 and the drive wheels 262, 264, during operation of the variable-cylinder engine 210 in the partial-cylinder or single-bank operating state by the partial-cylinder operation commanding means 284.

Figure 34:
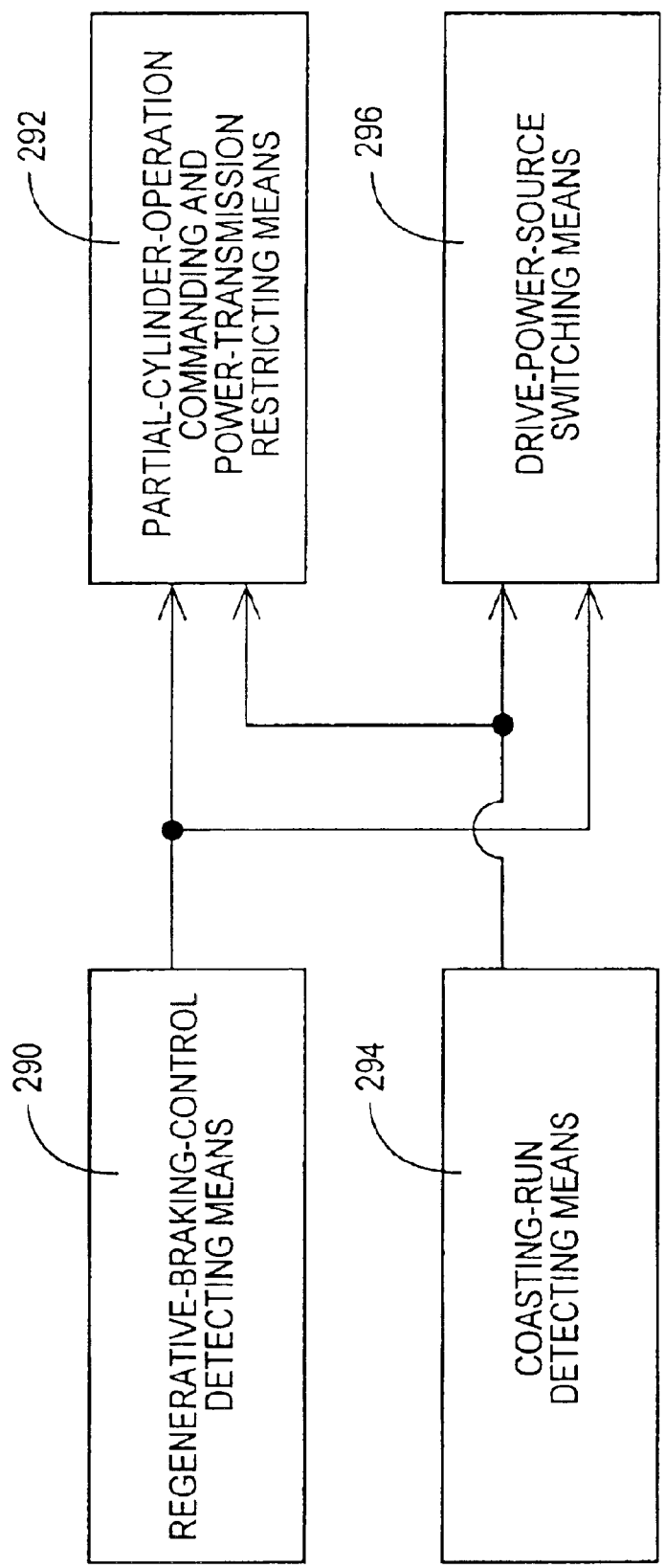
FIG. 34 is a block diagram illustrating some of functional means of an electronic control device in another embodiment of the invention.

FIG. 34 is a block diagram illustrating other functional means of the electronic control device 280. Regenerative-braking-control detecting means 290 shown in FIG. 34 is arranged to determine whether the vehicle is running with a regenerative braking operation of the MG1 or MG2 so as to convert a kinetic energy of the vehicle into an electric energy for charging the secondary battery. Partial-cylinder-operating commanding and power-transmission restricting means 292 is operable when the regenerative-braking-control detecting means 290 determines that the vehicle is running with a regenerative braking operation. The partial-cylinder-operating commanding and power-transmission restricting means 292 is arranged to place the variable-cylinder engine 210 in the partial-cylinder or single-bank operating state, and at the same time place the input clutch C1 in the slipping or released state, for restricting transmission of a drive force between the variable-cylinder engine 210 and a drive shaft disposed downstream of the engine 210. Coasting-run detecting means 294 is arranged to determine whether the vehicle is in a coasting run or in a decelerating state. The partial-cylinder-operation commanding and power-transmission restricting means 292 is operated when the coating-run detecting means 294 determines that the vehicle is in a coasting run and when the regenerative-braking-control detecting means 290 determines that the vehicle is running with a regenerative braking operation. In this case, the variable-cylinder engine 210 is operated in the partial-cylinder or single-bank operating state, and the input clutch C1 disposed between the variable-cylinder engine 210 and the downstream drive shaft is placed in the slipping or released state to restrict transmission of the drive force between the engine 210 and the drive shaft.

Figure 35:
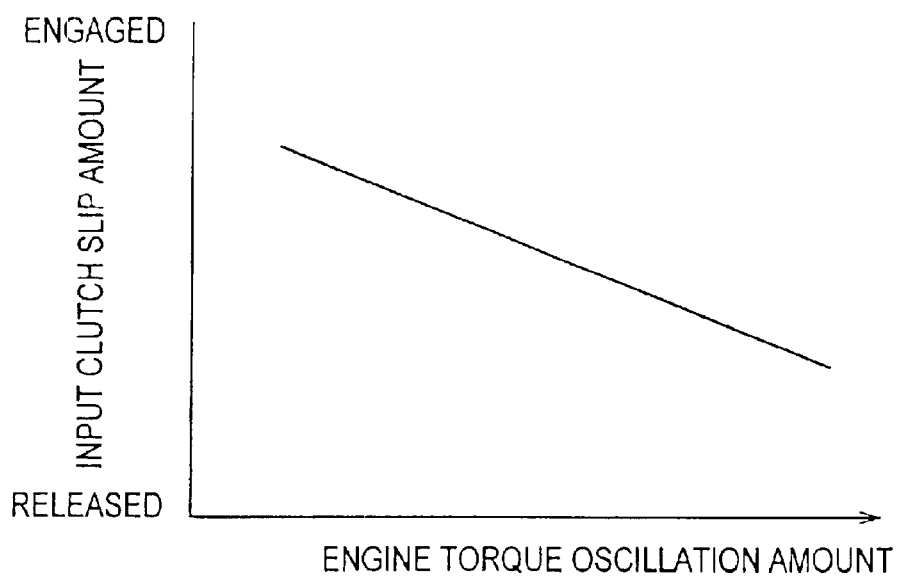
FIG. 35 is a view indicating a relationship used by partial-cylinder/power-transmission restricting means of FIG. 34 to obtain an amount of slipping of a clutch.
Figure 36:
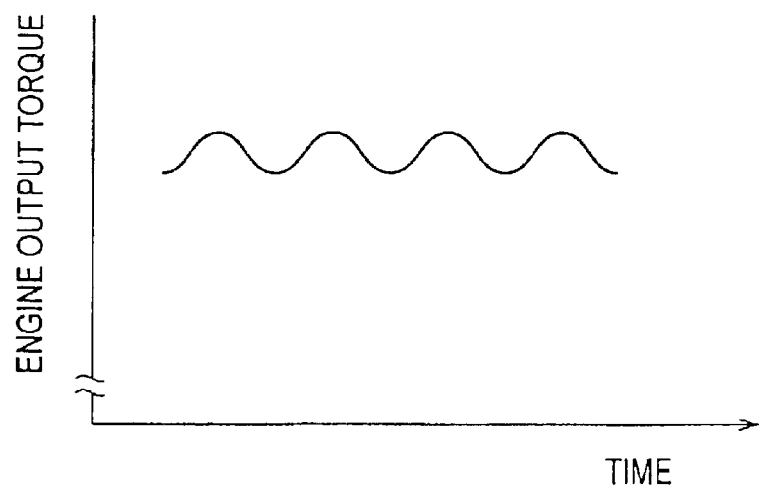
FIG. 36 is a view indicating output torque oscillation of the engine used by the partial-cylinder/power-transmission restricting means of FIG. 34 to obtain the amount of slipping of the clutch.

The partial-cylinder-operation commanding and power-transmission restricting means 292 is arranged, for instance, to determine an amount of slipping of the input clutch, on the basis of the engine torque oscillation amount included in the output torque of the variable-cylinder engine 210 (amplitude of the oscillating component, or a ratio of the amplitude of the oscillating component to the DC component), and according to a predetermined relationship between the slipping amount of the input clutch and the engine torque oscillation amount, which is formulated such that the slipping amount decreases with an increase in the engine torque oscillation amount, as indicated in FIG. 35. The actual amount of slipping of the input clutch C1 disposed between the variable-cylinder engine 210 and the continuously variable transmission 216 is controlled to be equal to the thus determined amount. FIG. 36 shows the engine torque oscillation included in the output torque of the variable-cylinder engine 210.

Drive-power-source switching means 296 is operable when the coasting-run detecting means 294 does not determine that the vehicle is in a coasting run, or when the regenerative-braking-control detecting means 290 does not determine that the vehicle is running with a regenerative braking operation. The drive-power-source switching means 296 is arranged, for example, to select the drive power source, and determine the number of the operating cylinders, on the basis of the actual vehicle running speed V and output torque, and according to the stored predetermined relationships shown in FIG. 31, so that the selected drive power source is operated, and the engine if selected as the drive power source is operated with the determined number of the cylinders in the operating state.

Referring to the flow chart of FIG. 37 illustrating a part of a control operation of the electronic control device 280, this control operation is repeatedly performed with a predetermined cycle time. The control operation is initiated with SF1 corresponding to the coasting-run detecting means 294, to determine whether the vehicle is in a coasting run. If an affirmative decision is obtained in SF1, the control flow goes to SF2 corresponding to the regenerative-braking-control detecting means 290, to determine whether the vehicle is running with a regenerative braking operation of the MG1 or MG2 so as to convert a kinetic energy of the vehicle into an electric energy for charging the secondary battery. If an affirmative decision is obtained in SF2, the control flow goes to SF3 and SF4 corresponding to the partial-cylinder-operating commanding and power-transmission restricting means 292, to place the input clutch C1 in the released or slipping state, and then place one of the banks of the variable-cylinder engine 210 in the compression state, while placing the other bank in the decompression state. In this respect, it is noted that although it is advantageous to place the input clutch C1 in the engaged state, for operating the variable-cylinder engine 210 with a required minimum torque, in order to permit easy starting of the full-cylinder operation of the engine 210, the back clearance of the engine is held small where the input clutch C1 is held in the released state. The input clutch C1 is turned to the engaged state immediately after the variable-cylinder engine 210 is returned back to the two-bank or full-cylinder operating state.

If a negative decision is obtained in SF1 or SF2, the control flow goes to SF5 corresponding to the drive-power-source switching means 296, to select the drive power source, and determine the number of the operating cylinders, on the basis of the actual vehicle running speed V and output torque, and according to the stored predetermined relationships shown in FIG. 31, so that the selected drive power source is operated, and the engine if selected as the drive power source is operated with the determined number of the cylinders in the operating state.

In the present embodiment, there are provided the regenerative-braking-control detecting means 290 for determining whether the determine whether the vehicle is running with a regenerative braking operation of the MG1 or MG2 so as to convert a kinetic energy of the vehicle into an electric energy, and the partial-cylinder-operating commanding and power-transmission restricting means 292 is operable upon determination by the regenerative-braking-control detecting means 290 that the vehicle is running with a regenerative braking operation, for placing the variable-cylinder engine 210 in the partial-cylinder or single-bank operating state, and at the same time placing the input clutch C1 in the slipping or released state, for restricting transmission of a drive force between the variable-cylinder engine 210 and the large-diameter sun gear 220 or small-diameter sun gear 222 disposed downstream of the engine 210. According to this arrangement, the fuel economy of the vehicle is improved, and the engine torque oscillation and noise are reduced, during running of the vehicle with a regenerative braking operation of the MG1 or MG2 so as to convert a kinetic energy of the vehicle into an electric energy, since the variable-cylinder engine 210 is placed in the partial-cylinder operating state and since the transmission of the drive force between the engine 210 and the downstream drive shaft is restricted.

The present embodiment is further provided with the coasting-run detecting means 294 for determining whether the vehicle is in a decelerating state. Upon determination by the coasting-run detecting means 294 that the vehicle is in a decelerating state, the partial-cylinder-operation commanding and power-transmission restricting means 294 places the variable-cylinder engine 210 in the partial-cylinder operating state and at the same time restrict transmission of the drive force between the variable-cylinder engine 210 and the downstream drive shaft. According to this arrangement, the fuel economy of the vehicle is improved, and the engine torque oscillation and noise are reduced, during deceleration of the vehicle with the regenerative braking operation, since the variable-cylinder engine 210 and placed in the partial-cylinder operating state and since the transmission of the drive force between the engine 210 and the downstream drive shaft is restricted.

The present embodiment is further arranged such that the drive-power-source switching means 296 is operated when the vehicle is not in a decelerating state or is not running with the regenerative braking operation. In this case, the switching means 296 determines the number of the operating cylinders of the variable-cylinder engine 210 on the basis of the actual running speed V and output torque and according to the stored predetermined relationships of FIG. 31, for instance, and operates the variable-cylinder engine 210 with the determined number of the cylinders placed in the operating state.

In the present embodiment, the partial-cylinder-operating commanding and power-transmission restricting means 292 is arranged to determine the amount of slipping of the input clutch on the basis of the oscillation amount included in the output torque of the variable-cylinder engine 210, and according to a stored predetermined relationship between these parameters, and control the input clutch C1 disposed between the variable-cylinder engine 210 and the continuously variable transmission 210 such that the actual amount of slipping of the input clutch is equal to the determined amount of slipping. The arrangement advantageously restricts the torque oscillation as needed. It is noted that the amount of slipping of the clutch 12 shown in FIG. 3, rather than the input clutch C1, may be controlled.

It is to be understood that the embodiments of the present invention have been described above for illustrative purpose only, and that various changes may be made in the present invention, without departing from the spirit and scope of the invention.

What is claimed is:

1. A control apparatus for a variable-cylinder engine to which an electric generator is operatively connected, said variable-cylinder engine having a plurality of cylinders, comprising:

an electricity-generating-mode determining device operable to determine whether it is required to establish an electricity generating mode in which said electric generator is operated to generate an electric energy; and a cylinder-number switching device, operable when said electricity-generating-mode determining device determines that it is required to establish said electricity generating mode, to place said variable-cylinder engine in a partial-cylinder operating state in which selected ones of said plurality of cylinders are operated.

2. A control apparatus for a vehicle to be driven by both or one of a variable-cylinder engine and an electric generator, as a drive power source, comprising:

a vehicle-deceleration detecting device operable to determine whether the vehicle is in a decelerating state; and a drive-power-source braking control device, operable when said vehicle-deceleration detecting device determines that the vehicle is in a deceleration state, to control a braking torque produced by said drive power source, on the basis of a regenerative braking torque produced by said electric generator, and an amount of decompression of non-operating cylinders of said variable-cylinder engine.

3. A control apparatus for a vehicle to be driven by a variable-cylinder engine and an electric motor as a drive power source, said variable-cylinder engine having a plurality of cylinders, comprising:

a motor-drive-mode detecting device operable to determine whether the vehicle is running in a motor-drive mode with an operation of said electric motor; and a partial-cylinder operation commanding device, operable when said motor-drive-mode detecting device determines that the vehicle is running in said motor-drive mode, to place said variable-cylinder engine in a partial-cylinder operating state in which selected ones of said plurality of cylinders are operated.

4. A control apparatus according to claim 3, further comprising power-transmission restricting device operable to restrict transmission of a drive force between said variable-cylinder engine and a drive shaft disposed downstream of said variable-cylinder engine, when said motor-drive-mode detecting device determines that the vehicle is running in said motor-drive mode.

5. A control apparatus according to claim 1, wherein said variable-cylinder engine has a pair of banks each of which has a plurality of cylinders and which are operable independently of each other, and said cylinder-number switching device is operable to place one of said pair of banks of said variable-cylinder engine in an operating state and place the other bank in a decompression state, when said electricity-generation-mode determining device determines that said electric generator is required to be operated to generate an electric energy.

6. A control apparatus according to claim 1, wherein the vehicle has a shift lever having a plurality of operating positions including at least one drive position for driving the vehicle, and at least one non-drive position in which the vehicle is not driven, said cylinder-number switching device being operable to change the number of operating cylinders of said variable-cylinder engine which are used to operate said electric generator, depending upon a presently selected one of said operating positions of said shift lever, such that all of said plurality of cylinders are placed in an operating state when said shift lever is placed in any one of said at least one drive position, and selected ones of said plurality of cylinders are placed in an operating state when said shift lever is placed in any one of said at least one non-drive position.

7. A control apparatus according to claim 2, further comprising:

a desired-deceleration calculating device, operable when said vehicle deceleration detecting device determines that the vehicle is in the decelerating state, to calculate a desired deceleration value of the vehicle under deceleration, on the basis of an actual running speed of the vehicle and a preset deceleration value preset by the operator of the vehicle, and according to a stored predetermined relationship among said desired deceleration value, said actual running speed and said preset deceleration value, and wherein said drive-power-source braking control device is operable to control said drive-power-source braking torque, on the basis of the regenerative braking torque produced by said electric generator and the decompression state of said non-operating cylinders of said variable-cylinder engine such that said actual deceleration value of the vehicle coincides with the desired deceleration value calculated by said desired-deceleration calculating device.

8. A control apparatus according to claim 2, wherein said drive-power-source braking control device includes:

a regenerative-braking-torque control device operable to control an amount of regenerative braking torque produced by said generator;

a decompression-state setting device operable to place selected ones of the cylinders of said variable-cylinder engine in a decompression state; and a decompression-amount control device operable to control a resistance of those selected cylinders to a rotary motion of said engine.

9. A control apparatus according to claim 2, wherein the vehicle includes a fluid-coupling device disposed between said variable-cylinder engine and a transmission, said control apparatus further comprising:

a regenerative-braking-adjustment detecting device operable to determine whether it is necessary to adjust a regenerative braking operation of said electric generator; and a lock-up clutch releasing device operable to place said fluid-coupling device in a released or partially slipping state, when said regenerative-operation-adjustment detecting device determines that it is necessary to adjust said regenerative braking operation.

10. A control apparatus according to claim 3, wherein the vehicle includes a continuously variable transmission through which a drive force of said variable-cylinder engine is transmitted to a drive wheel of the vehicle.

* * * * *